United States Patent
Yang et al.

(10) Patent No.: US 11,199,947 B2
(45) Date of Patent: Dec. 14, 2021

(54) GROUP-BASED VIEW IN USER INTERFACES

(71) Applicant: EMC IP Holding Company LLC, Hopkinton, MA (US)

(72) Inventors: Zhe Yang, Chengdu (CN); Jeremy Swift, Plymouth, MN (US); Zhu Mao, Chengdu (CN); Venoy Qiang Ma, Chengdu (CN); Cora Yao Chen, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/740,919

(22) Filed: Jan. 13, 2020

(65) Prior Publication Data

US 2021/0216174 A1    Jul. 15, 2021

(51) Int. Cl.
    *G06F 3/0482* (2013.01)
    *H04L 12/24* (2006.01)

(52) U.S. Cl.
    CPC ........... *G06F 3/0482* (2013.01); *H04L 41/22* (2013.01)

(58) Field of Classification Search
    CPC ................................ G06F 3/0482; H04L 41/22
    See application file for complete search history.

(56) References Cited

U.S. PATENT DOCUMENTS

| | | | | |
|---|---|---|---|---|
| 6,966,033 B1* | 11/2005 | Gasser | .................... | H04L 41/22 715/738 |
| 7,080,225 B1* | 7/2006 | Todd | ....................... | G06F 3/061 711/154 |
| 7,290,017 B1* | 10/2007 | Wang | .................. | G06F 11/2069 |
| 7,315,985 B1* | 1/2008 | Gauvin | ................... | H04L 41/12 715/734 |
| 7,721,211 B1* | 5/2010 | Yehuda | .................... | H04L 41/22 715/734 |
| 7,827,136 B1* | 11/2010 | Wang | .................. | G06F 11/2097 707/610 |
| 8,015,235 B1* | 9/2011 | Bauer | .................... | G06F 9/5061 709/201 |
| 9,442,810 B2* | 9/2016 | Jaisinghani | ........... | H04L 47/829 |
| 9,503,330 B2* | 11/2016 | Zhang | ..................... | H04L 41/22 |
| 9,940,073 B1* | 4/2018 | Thangapalam | ....... | G06F 3/0665 |

(Continued)

*Primary Examiner* — Tadesse Hailu
(74) *Attorney, Agent, or Firm* — Muirhead and Saturnelli, LLC

(57) ABSTRACT

Techniques for performing system management may include: defining groups, wherein each group includes one or more systems managed using a management application; selecting a scoping level, wherein the scoping level selected is one of multiple scoping levels including an all systems level, a group level, and an individual system level, wherein selecting the group level includes selecting a particular one of the multiple groups, and wherein selecting the individual system level includes selecting a particular one of the systems managed using the management application; and performing one or more operations in accordance with the scoping level. Information may be displayed in accordance with the selected scoping level. The multiple scoping levels may include multiple levels of groups. The scoping level may be selected using a menu of a graphical user interface of the management application. The systems may be data storage systems, such as data storage arrays.

21 Claims, 16 Drawing Sheets

(56) References Cited

U.S. PATENT DOCUMENTS

| | | | | |
|---|---|---|---|---|
| 9,959,522 B2* | 5/2018 | Kenna, III | ............. | G06Q 10/10 |
| 10,067,840 B1* | 9/2018 | Labaj | .................. | G06F 11/3058 |
| 10,834,022 B2* | 11/2020 | Paul | .................... | H04L 41/5051 |
| 2006/0069862 A1* | 3/2006 | Kano | .................... | G06F 3/0647 |
| | | | | 711/114 |
| 2007/0061512 A1* | 3/2007 | Taguchi | ................ | G06F 1/3221 |
| | | | | 711/114 |
| 2008/0104349 A1* | 5/2008 | Maruyama | ............ | G06F 3/0622 |
| | | | | 711/165 |
| 2009/0150639 A1* | 6/2009 | Ohata | .................. | G06F 3/0665 |
| | | | | 711/172 |
| 2016/0285707 A1* | 9/2016 | Pawlowski | ......... | G06F 3/04842 |
| 2017/0230306 A1* | 8/2017 | Cropper | ................ | G06F 9/5083 |

* cited by examiner

GROUP-BASED VIEW IN USER INTERFACES

BACKGROUND

Technical Field

This application generally relates to user interfaces, and more particularly, providing a flexible group-based view that may be used in connection with user interfaces.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for performing system management comprising: defining a plurality of groups, wherein each group includes one or more systems managed using a management application; selecting a scoping level, wherein the scoping level selected is one of a plurality of scoping levels including an all systems level, a group level, and an individual system level, wherein selecting the group level includes selecting a particular one of the plurality of groups, and wherein selecting the individual system level includes selecting a particular one of the systems managed using the management application; and performing one or more operations in accordance with the scoping level. In at least one embodiment, selecting the scoping level may be performed using a graphical user interface (GUI) of the management application and may include selecting the scoping level using a drop down menu of the GUI. Selecting the scoping level may include selecting a first group of the plurality of groups displayed in the dropdown menu of the GUI to expand the first group and further display in the drop down menu of the GUI a first set of systems included in the first group; and selecting the individual system level including selecting a first system of the first set of system displayed in the dropdown menu of the GUI. Processing may include selecting the group level including selecting a first group of the plurality of groups displayed in the dropdown menu of the GUI. Processing may include selecting the all systems level from the drop down menu of the GUI.

In at least one embodiment, the one or more operations may include a first operation to display information in the GUI in accordance with the scoping level selected. The first operation may include displaying information regarding any of: systems, storage objects, logical devices, file systems, statistics, performance metrics, a health indicator in accordance with the scoping level selected. The one or more operations may include a first operation that includes migrating or replicating data from a first group of the plurality of groups to a second group of the plurality of groups, and wherein the first group may be selected as the scoping level. The first group may include a first plurality of logical devices that are replicated to the second group. The one or more operations may include a first operation that includes migrating or replicating data from a first system of a first group to a second system of the first group, wherein the first group may be selected as the scoping level. The first operation may include defining one or more criteria identifying trigger conditions of when to migrate or replicate a first logical device from the first system of the first group to the second system of the first group. The one or more criteria may include automatically migrating or replicating the first logical device from the first system of the first group to the second system of the first group when the first system is unhealthy. The one or more criteria include automatically migrating or replicating the first logical device from the first system of the first group to the second system of the first group when a pool from which storage is allocated for the first logical device has an allocated capacity exceeding a threshold level. The one or more criteria may include automatically migrating or replicating the first logical device from the first system of the first group to the second system of the first group when an average processor utilization within a defined time period for one or more processors of the first system exceeds a threshold utilization level. The plurality of scoping levels may include at least four levels, and wherein the plurality of scoping levels may include at least group two levels of groups. One group in a first of the two group levels may include a first plurality of groups in a second of the two group levels and wherein each group of the first plurality of groups may include one or more of the systems managed using the management application.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
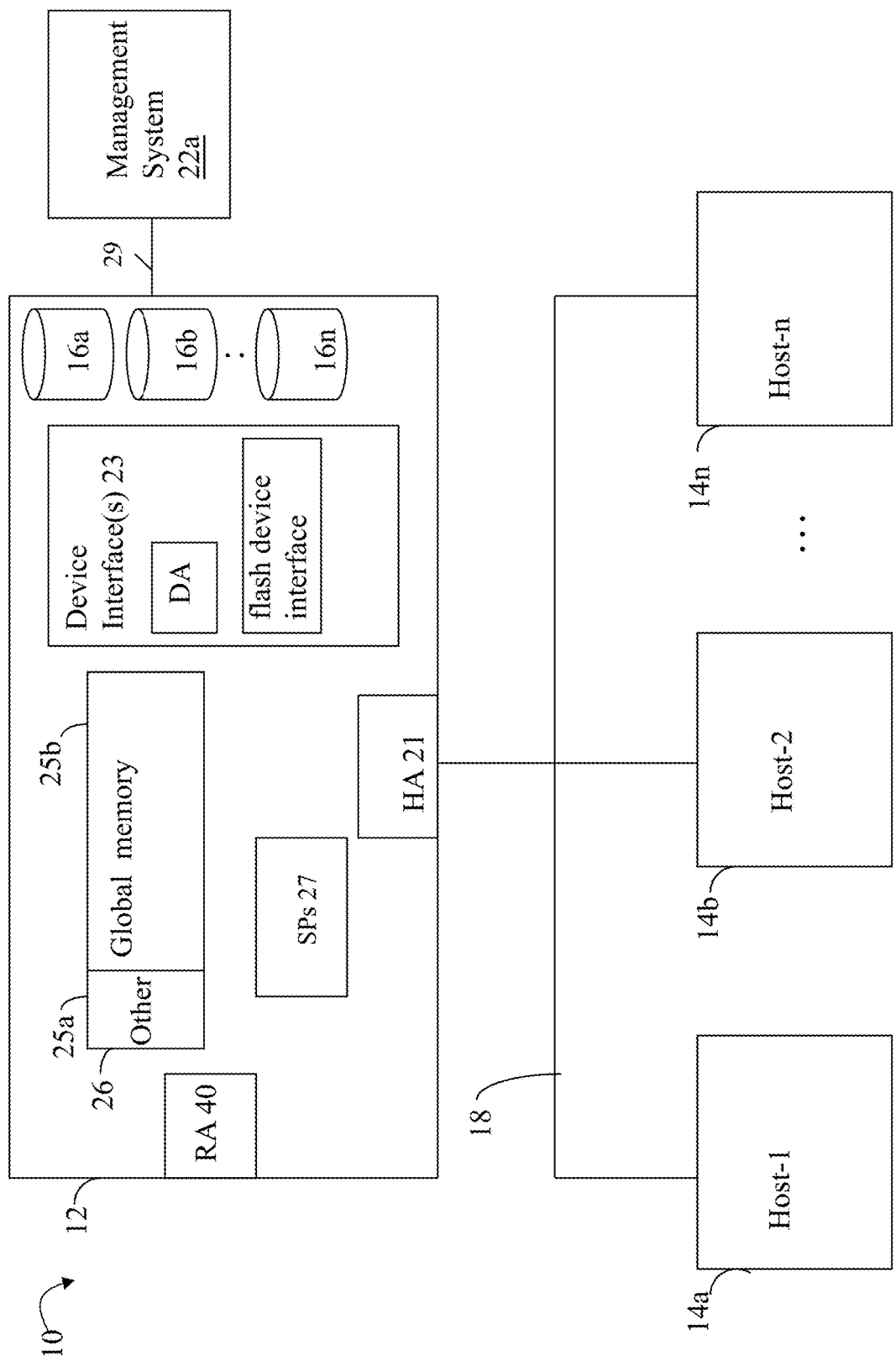
FIG. 1 is an example of components that may be included in a system in accordance with techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS), and the like. Some or all of the connections by which the hosts 14a-14n and the data storage system 12 may be connected to the communication medium 18 may pass through other communication devices, such switching equipment that may exist such as a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In at least one embodiment, a LUN may a thick or regular LUN in which the physical storage for the full capacity of the LUN may be provisioned when the LUN is created. As a variation in such an embodiment, a LUN may alternatively be a thin LUN or virtually provisioned LUN. With a thin LUN, the physical storage for the LUN may be allocated in chunks on demand the first or initial time there is a write to a logical address portion that is mapped to a particular chunk.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and the control path each define two separate logical flow paths.

A management application, such as one that may be used to manage multiple data storage systems, may include a GUI. The management application GUI may provide a centralized view for all the managed systems, for example, by aggregating information including statistics, alerts, status, storage capacity, performance, and the like, for the multiple data storage systems into a dashboard of the GUI. The GUI may also allow a user to view information about each individual system, such as statistics, alerts, storage capacity, performance, and the like, for a single data storage system. However, the management application may not provide the user with the ability to view information at any other logical level other than the foregoing centralized view of all systems or about a single system.

It may be desirable to have a GUI of the management application, or more generally any suitable application, that provides one or more additional different levels of managed systems for performing various operations, such as for viewing information about managed systems.

Described in following paragraphs are techniques that may be used with a GUI of the management application to provide at least one additional different level of viewing information about managed systems. A group concept may be used to represent a user-defined logical group of management systems. In at least one embodiment, the techniques may be used to provide customizable grouping through the GUI where the user may define one or more logical groups of data storage systems managed using the management application. The GUI may allow the user to switch between different viewing levels affecting what information is displayed in the GUI. The viewing levels may include an all systems aggregated view, a group level view and a single system view. Thus, for example, a user of the GUI may view information including any one or more of: statistics, alerts, status, storage capacity, performance, and the like, at any of the different levels. As another example, different operations such as replication or migration, may be performed with respect to migration or replicating data from LUNs of one group to another group, or from one LUN to another LUN within a single group.

In at least one embodiment in which the systems are data storage systems, the data storage systems managed by the application may be configured in a federation whereby the all systems view may provide a federation level view of all data storage systems in the federation.

In at least one embodiment, one or more groups of data storage systems may be defined based on one or more attributes or characteristics. Systems included in the same group may have the same or similar attributes or characteristics. Each of the groups of systems may correspond to a different logical grouping, for example, such as a different business purpose or function, a different geographical area, and the like. For example, in at least one embodiment, multiple groups of data storage systems may be defined based on business purposes and business functions. Thus, each group of systems may have different storage consumption requirements and characteristics. In such an embodiment, a first group of data storage system may be defined that includes data storage systems that are production or development systems actively used by a business. The first group of systems may, for example, need a high level of I/O performance and a high level of availability. The first group of systems may, for example, include physical storage devices such as flash-based storage providing for high I/O response times. A second group of data storage systems may be defined that includes data storage systems used for backup purposes. The second group of systems may, for example, use storage media of a lower price per GB than systems of the first group. Systems of the second group may provide data storage services such as compression and deduplication. A third group of data storage systems may include the data storage systems used to store financial data for a business. The third group of systems may be used, for example, by the finance, and accounting departments of the business. Systems of the third group may see an increase in consumed storage capacity and generally usage at regular intervals, such as at the end of each month or year, at tax time, and the like, based on when financial information is aggregated and needed for financial, business, and tax purposes. As a result, the storage administrators may need to monitor different metrics, alerts, and the like, for the different groups of systems. Using the techniques herein, the administrator may monitor the metrics, alerts, and the like, for one group at a time within the GUI of the management application used to manage such systems forming the groups.

In at least one embodiment, the user of the GUI of the management application may create groups that contain storage systems consumed by different business units, different applications, or different geographical regions. The GUI may provide a centralized view with multiple scoping levels. In one embodiment, the multiple scoping levels may include three scope levels including an all system level, a group level, and an individual system level. In such an embodiment, storage systems with the same business purposes may be monitored and managed as a single one of the defined groups. A scope level navigation bar may be included in the GUI that shows the current scope level selected. The GUI may provide a user with the ability to easily navigate and switch between the all system level, group level, and individual system level.

The foregoing and other aspects of the techniques herein are described in more detail in the following paragraphs.

In the following examples, reference is made to a management application for managing data storage systems. In such examples, groups of data storage systems may be created based on different business purposes so that all systems in a single group may include data storage systems having the same business purposes or the same business unit. More generally, the techniques herein may be used with any suitable application to create groups of entities for any suitable purposes. Thus, examples and specifics used herein for purposes of illustration are non-limiting examples and may be more generally applied with any suitable application and use. In such an embodiment, the commands issued from the GUI of the management application may be issued over the control path.

Figure 2:
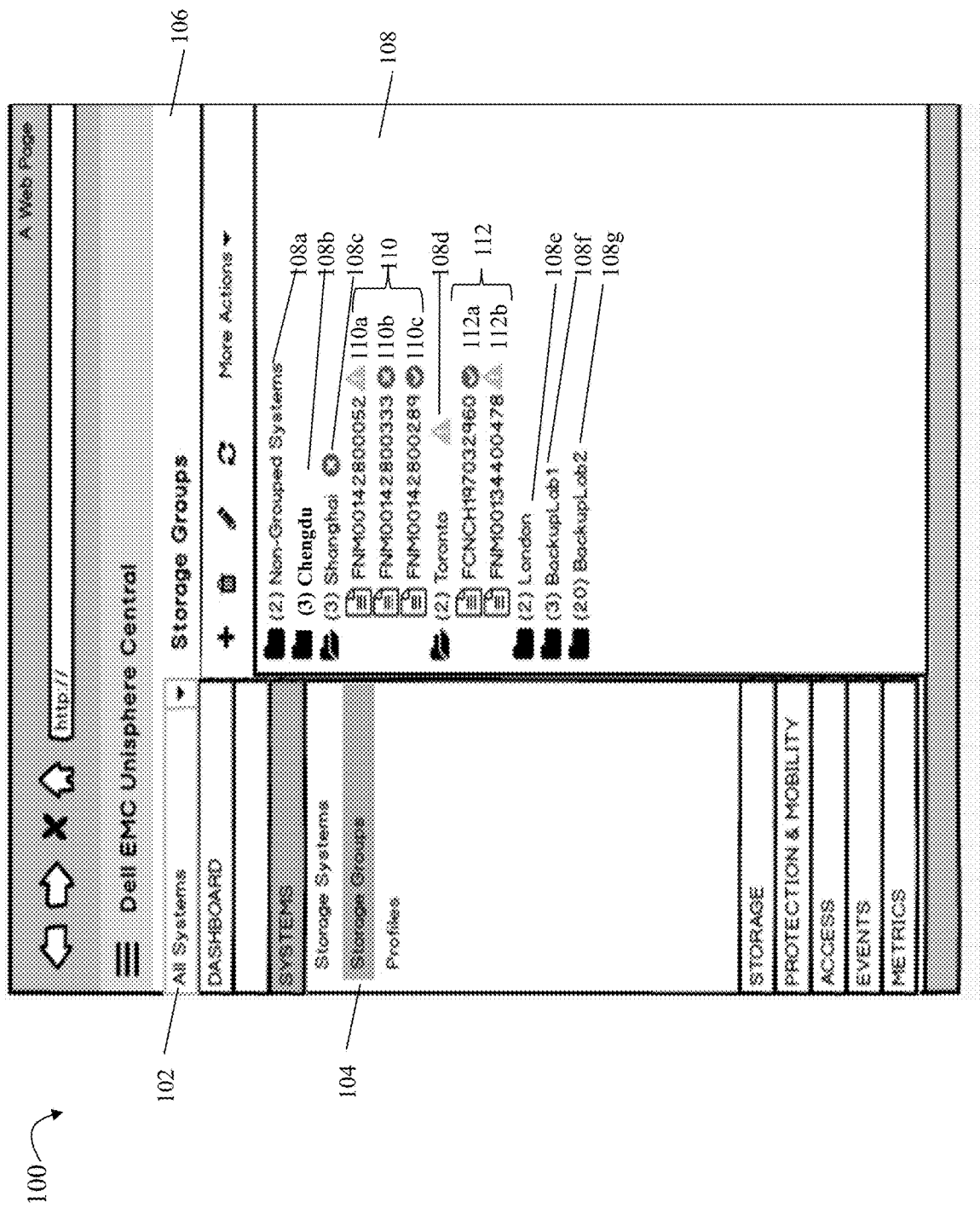
FIGS. 2, 3, 4, 5, 6A, 6B, 7, 8, 9, 10, 11 and 12 are various screenshots of a graphical user interface in an embodiment in accordance with the techniques herein.

Referring to FIG. 2, shown is an example 100 of a portion of a first screenshot of a GUI of a management application in an embodiment in accordance with the techniques herein.

In the example 100, a group concept is illustrated and used to represent the storage systems that are serving the same business purpose or include data storage systems in a particular geographic area, such as a particular city. Generally, the administrators can create groups that include storage systems consumed by, for example, different business units or different applications or different geographic sites. In the example 100, the management application GUI illustrates the different existing groups of data storage systems as well as those systems that are not included in any of the currently defined groups.

In this embodiment, there are 3 scope levels—the all system level, the group level, and the individual system level. The all system level may provide information, navigation and operations with respect to all data storage systems managed using the application. The group level may provide for selection of a particular group and provide information, navigation and operations with respect the selected group. The individual system level may provide for selection of a particular system and provide information, navigation and operations with respect the selected single system.

In the example 100, the element 102 identifies the currently selected scope level which is all systems. Selection and navigation between different scoping levels and the effect of the different scoping levels on the GUI is described in more detail below and in connection with other figures.

The element 104 may be select to display information about the currently defined groups of storage systems, or storage groups. Thus, responsive to selecting the element 104, the field 106 and the panel 108 may be accordingly updated. In this example 100, the element 106 is updated to be "Storage Groups" and the panel 108 updated to display information about the currently defined storage groups in the system. In the panel 108, element 108a may identify the data storage systems that are non-grouped and have not been included in a defined logical group or storage group of data storage systems. Elements 108b, 108c, 108d, 108e, 108f and 108g denote the different existing groups that have been previously created by a user and are in existence at the time the screenshot 100 of the GUI is obtained.

The information in the panel 108 is a tree-like or hierarchical view of the groups and systems within the groups. In the example 100, the non-grouped systems 108a may be characterized as a logical grouping of those systems not specifically included in any other ones of the user-defined storage groups 108b-g. For each of the groups 108a-g, an integer in parenthesis next to the group name denotes the number of systems in that particular group. Additionally, a group health status indicator is displayed next to the group name with an icon if all systems in the group are not healthy or have at least one system in a degraded health state other than healthy. In at least one embodiment, there may be 4 different health states or alert levels—critical, error, warning and healthy—with respect to alerts. The 4 health states may be ranked, from least healthy to most healthy, as follows: critical, error, warning and healthy. The healthy state or alert level for a group may denote that there are no warning, error or critical level alerts for the group. The critical state or alert level may denote that there is a critical level alert for the group. The error state or alert level may denote that there is an error level alert for the group. The warning state or alert level may denote that there is a warning level alert for the group. Thus, in the panel 108 of the example 100, if all systems in a group are healthy having no warning, error or critical level alerts, there is no group level icon next to the group in the panel 108. Otherwise, displayed in the panel 108 next to the particular group is a group level health indicator.

To view the particular systems in any one of the groups, a user may select one of the groups 108a-g. In the example 100, the panel 108 shows the results after the user has selected group 108c and group 108d to view the particular systems in those groups. In a similar manner although not illustrated in the example 100, a user may select any of the other groups 108a, 108b, 108e-g to view the systems in the selected group. In the example 100, the groups 108b, 108c, 108d and 108e each include systems of a particular city or geographical area denoted by the group name; and the groups 108e-f each include data storage systems used for backup or for storing backup data.

The element 108a indicates that there are 2 non-grouped systems and all non-grouped systems are healthy with no warning, error or critical alerts. Thus the non-grouped systems 108a has a group health status of healthy. The element 108b indicates that the Chengdu group includes 3 systems and has a group health status of healthy where no systems in the Chengdu group have no warning, error or critical alerts.

The element 108c indicates that the Shanghai group includes 3 systems and has a group health status of critical as denoted with the "X" indicator next to "Shanghai". The group health status may denote a collective or aggregated health of the group. The group health status for a group may be the least healthy status of any system in the group. Thus, if any system in the group has a critical alert, the group level health indicator is the critical level indicator; if any system in the group has an error alert, the group level health indicator is the error level indicator; and if any system in the group has a warning alert, the group level health indicator is the warning level indicator. In this example, the user has selected 108c to view the systems and associated system level health indicators for systems in the group 108c. In response to selecting the group 108c, the information of 110 may be displayed that shows the systems and associated health indicators for the systems in the group 108c. Element 110a indicates a first system in the group 108c has a health status of the warning level as denoted by the exclamation point "!" icon. Element 110b indicates a second system in the group 108c has a health status of the critical level as denoted by the "X" icon. Element 110c indicates a third system in the group 108c has a health status of healthy level as denoted by the checkmark "✓" icon.

The element 108d indicates that the Toronto group includes 2 systems and has a group health status of warning as denoted with the exclamation point "!" indicator next to "Toronto". The group health status may denote the least healthy status of any system in the group. In this example, the user has selected 108d to view the systems and associated system level health indicators for systems in the group 108d. In response to selecting the group 108d, the information of 112 may be displayed that shows the systems and associated health indicators for the systems in the group 108d. Element 112a indicates a first system in the group 108d has a health status of healthy level as denoted by the checkmark "✓" icon. Element 112b indicates a second system in the group 108d has a health status of warning level as denoted by the exclamation point "!" icon.

The element 108e indicates that the London group includes 2 systems and has a group health status of healthy where no systems in the group 108e have warning, error or critical alerts. The element 108f indicates that the BackupLab1 group includes 3 systems and has a group health status of healthy where no systems in the group 108f have warning or error alerts. The element 108g indicates that the BackupLab2 group includes 20 systems and has a group health status of healthy where no systems in the group 108g have warning, error or critical alerts.

In at least one use of the storage groups displayed in the panel 108 of the GUI 100, at a first point in time a user may view the list of storage groups 108a-g without having any further expansion of the particular systems in each group. The user may noted that groups 108c-d have an unhealthy indicator level for the group. At a second point in time, the user may select the groups 108c and 108d to view additional information regarding the health of the systems in such groups since the group 108c has a critical level health status denoted by the "X" icon and since the group 108d has a warning level health status denoted by the "!" icon. In this manner the user may drill down to view the health status of the particular groups and subsequently view the health status of systems within the selected groups 108c-d. The foregoing may be performed, for example, as part of system management for troubleshooting purposes to determine the particular one or more systems that may be unhealthy or have associated warnings, errors and/or critical alerts. Thus, the GUI as displayed in the FIG. 2 may be used to easily identify the unhealthy groups and also easily identify the particular system(s) in a group that are causing the unhealthy group status.

Figure 3:
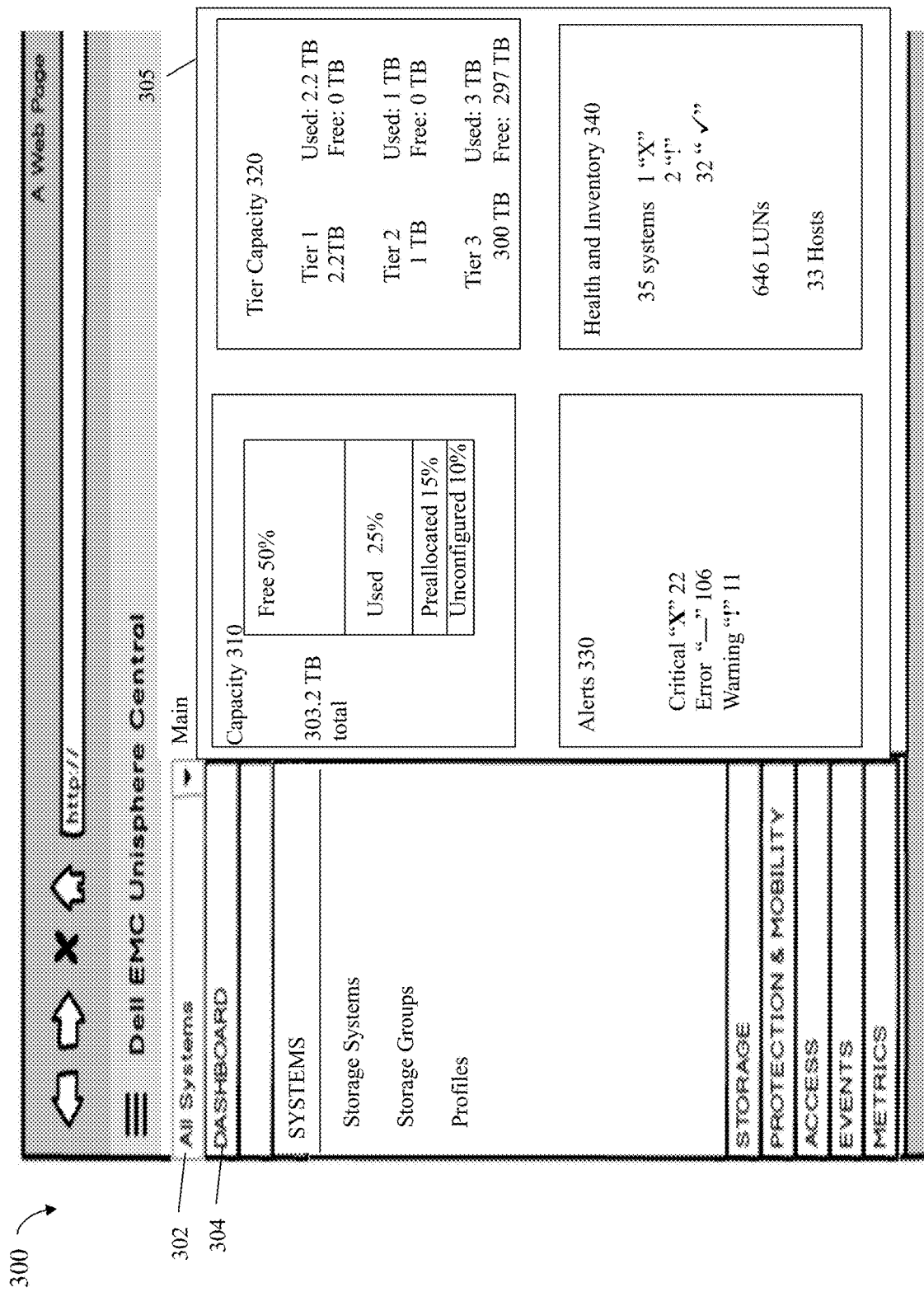

Referring to FIG. 3, shown is a second screenshot that may be displayed in a GUI in an embodiment in accordance with the techniques herein. The example 300 indicates in the field 302 that the current scoping level is all systems and thus information may be displayed collectively in the dashboard for all the data storage systems managed by selecting element 304. Selecting element 304 results in updating the panel 305 of the display as illustrated. The panel 305 includes capacity information 310, tier capacity 320, alerts 330 and health and inventory 340 regarding all managed systems per the all systems scope level 302.

The capacity 310 indicates that the total capacity of all the data storage systems managed, such as in a managed federation, includes 303.2 TB (terabytes) with 50% of the capacity free, 25% used, 15% preallocated and 10% unconfigured (e.g., not configured into RAID groups or storage pools for use in provisioning for LUN storage).

The tier capacity 320 indicates information regarding 3 storage tiers across all the data storage systems managed. In this example, there may be 3 tiers of storage ranked, in terms of performance from highest performance to lowest performance, Tier 1, Tier 2, and Tier 3. Tier 1 may be, for example, flash-based storage that has the highest cost/GB of storage of all 3 tiers. Tier 2 may be a lower performance tier than Tier1 but higher performance than Tier 3. Tier 2 may have a lower cost/GB than Tier 1 but a higher cost/GB than Tier 3. Tier 3 may be the lowest performance tier of all 3 tiers and have the lowest cost/GB of all 3 tiers. In this example Tier 1 total capacity may be 2.2 TB across all data storage systems with all Tier 1 capacity used. Tier 2 total capacity may be 1 TB across all data storage systems with all Tier 2 capacity used. Tier 3 total capacity may be 300 TB across all data storage systems with only 3TBs of the Tier capacity used and 297 TB of the Tier 3 capacity free.

The alerts 330 indicates a summary of the different levels of alerts across all data storage system managed. In this example, there are 22 critical level alerts, 106 error level alerts and 11 warning level alerts.

The health and inventory 340 provides a high level summary of the components and the health level indicators and alerts across all the systems managed. For example, assume there are 35 total data storage systems managed using the management application with the GUI. In this case, element 340 indicates that 1 data storage system has a critical level health indicator; 2 data storage system have a warning level health indicator; and the remaining 32 data storage systems are healthy. Also, the element 340 indicates that there are a total of 646 LUNs configured across all the 35 managed data storage systems and that there are 33 hosts in the SAN configuration with the 35 managed data storage systems. Thus each of the 33 hosts store data on one or more of the 35 managed data storage systems.

As noted above, the field 302 denotes the currently selected and active scoping level affecting the level at which information is displayed in the dashboard 305 as a result of selecting the dashboard element 304 from the GUI. If a different scoping level other than all systems is active and accordingly displayed in the field 302, selection of the dashboard element 304 results in displaying the categories of information (e.g., capacity 310, tier capacity 320, alerts 330, and health and inventory 34) as illustrated in 305 but for the selected scoping level indicator. For example, if the field 302 included the name of one of the selected groups, such as Chengdu, the subsequent selection of the dashboard element 304 would display the categories of information as in 305 but for only the data storage systems in the Chengdu group. As another example, if the field 302 included the name of one of the selected data storage system, such as one of the non-groups systems or a particular data storage system in the group Chengdu, the subsequent selection of the dashboard element 304 would display the categories of information as in 305 but for only the selected single data storage system. In this manner, the active or current scoping level selection as indicated by the field 102 denotes the particular scoping view applied in connection with subsequent operations, such as selection of the dashboard element 304 to view information.

Thus, a consistent centralized dashboard view such as displayed in the FIG. 3 may be displayed in accordance with the selected active scoping level. The selected active scoping level may be one of: all systems for the all system level, a selected group for the group level, and a selected individual data storage system for the individual system level.

Figure 4:
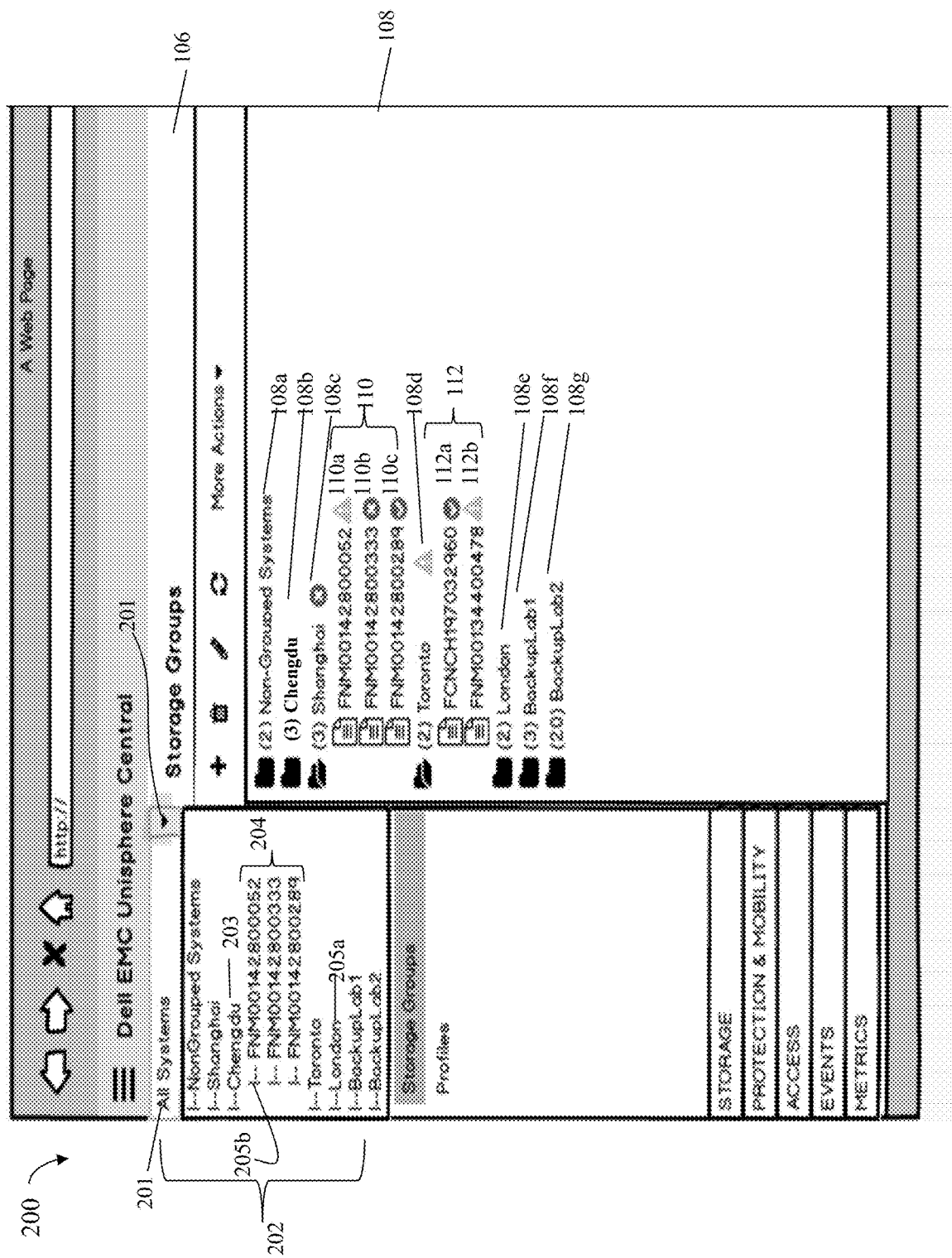

Referring to FIG. 4, shown is a third screenshot that may be displayed in a GUI in an embodiment in accordance with the techniques herein. The example 200 illustrates in more detail the scope level navigation bar that may be used to switch between the 3 different scoping levels.

The screenshot 200 of FIG. 4 may be the same screenshot as described in connection with the example 100 of FIG. 2 with the difference that the additional detail is illustrated regarding the scope level navigation bar. In connection with the embodiment of FIG. 4, the scope level navigation bar may be implemented using a drop down menu from which a user my select and activate a current scope level. The field 201 indicating the current scope level may be selected, such as by right clicking on the arrow 201 which results in displaying the drop down menu 202. The menu 202 may list the groups 108a-g as also included in the panel 108. Additionally, a user may further select a particular group from the menu 202, such as the Chengdu group 203, to further expand and list the systems included in the selected group. For example, responsive to selecting 203, the list of systems 204 may be displayed.

A user may change the scoping level to a particular group or a particular data storage system by making a selection from the drop down menu 202. For example, to change the scoping level to the group level for the Toronto group, element 205a is selected; to change the scoping level to the single system level for the first listed data storage system in the Chengdu group 203, element 205b is selected; to change the scoping level to the group level for the Chengdu group, element 203 is selected; and so on where the scoping level may be changed to any particular group or system selected from the menu 202.

By selecting a particular scoping level, subsequent views and operations of the GUI are affected since such information displayed and such operations may be impliedly performed with respect to the active selected scoping level. Examples illustrating this will now be described.

Referring again to FIG. 4, assume that the scoping level is changed to a group level where the Chengdu group is selected as the active group by selecting element 203 from the menu 202.

Figure 5:
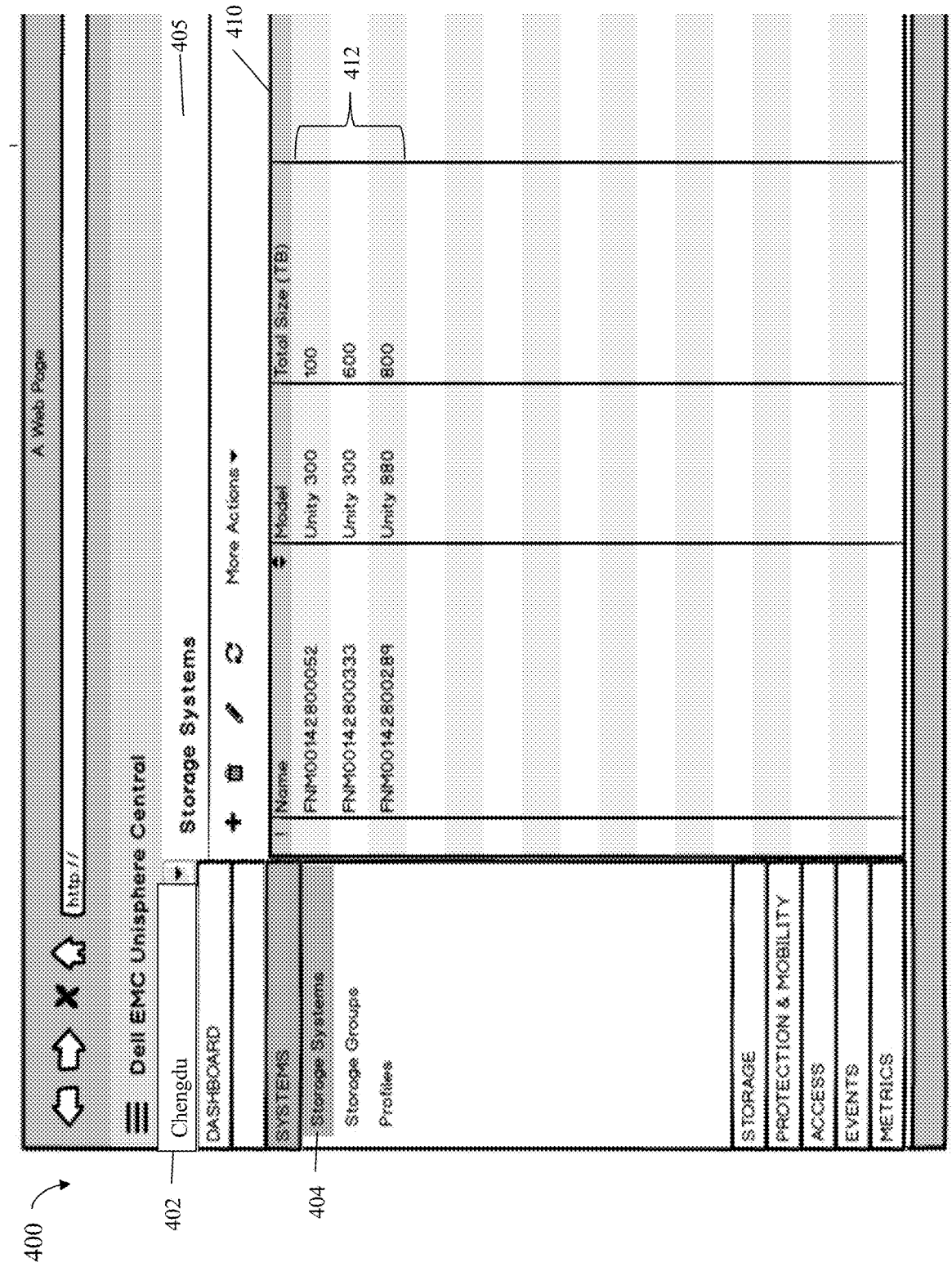

Referring to FIG. 5, shown is a fourth screenshot that may be displayed in a GUI in an embodiment in accordance with the techniques herein. The example 400 includes the field 402 indicating that the current scoping level is set to the Chengdu group.

After switching the scoping level to the Chengdu group as just described by selecting the element 203 of the menu 202 of FIG. 4, assume the user now selects element 404 denoting the storage systems (in the systems panel) to display the data storage systems based on the current scoping level. Responsive to selecting 404, the field 405 is updated to indicate storage systems. Also responsive to selecting 404, the panel 410 is updated to include the list of data storage systems 412 based on the currently active and selected scoping level of the Chengdu group. The list 412 lists the 3 data storage systems currently included in the Chengdu group. If, as an alternative, another group such as the Toronto group had been selected from the menu 202 of the FIG. 4, the current scoping level 402 would be the Toronto group and the list 412 would include the 2 data storage systems of the Toronto group. If, as yet another alternative, the current scoping level selected from the menu 202 of FIG. 4 is All systems, then the current scoping level 402 would be all systems and the list 412 would include all 35 managed data storage systems (e.g., all the data storage systems of the groups and all the non-grouped systems managed using the management application with the GUI).

Figure 6A:
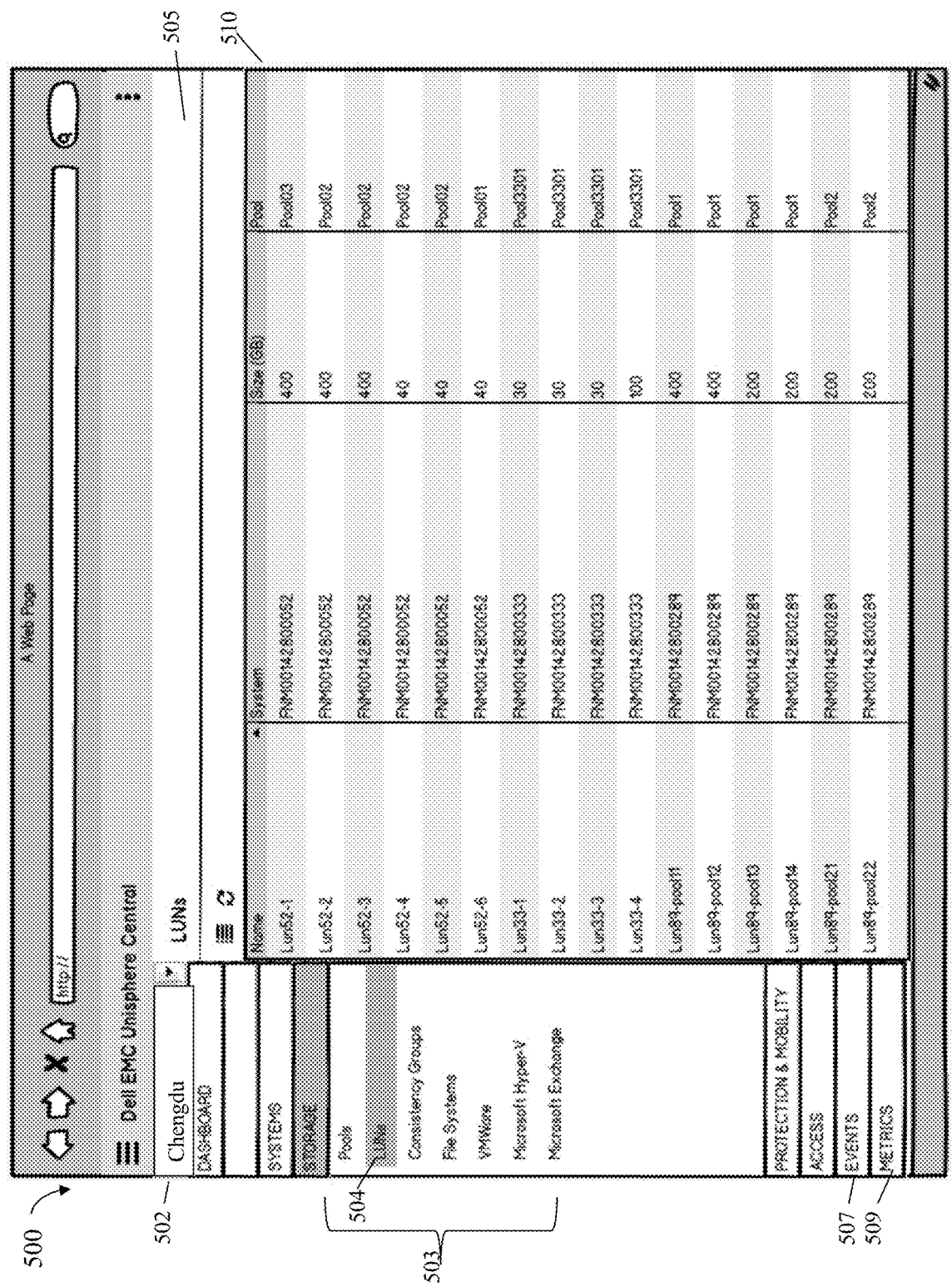

Referring to FIG. 6A, shown is a fifth screenshot that may be displayed in a GUI in an embodiment in accordance with the techniques herein. The example 500 includes the field 502 indicating that the current scoping level is set to the Chengdu group.

After switching the scoping level to the Chengdu group as just described by selecting the element 203 of the menu 202 of FIG. 4, assume the user now selects element 504 denoting the LUNs (in the storage panel) to display the LUNs based on the current scoping level. Responsive to selecting 504, the field 505 is updated to indicate LUNs. Also responsive to selecting 504, the panel 510 is updated to include the list of LUNs based on the currently active and selected scoping level of the Chengdu group. The list 410 lists all the LUNs in the 3 data storage systems currently included in the Chengdu group. If, as an alternative, another group such as the Toronto group had been selected from the menu 202 of the FIG. 4, the current scoping level 502 would be the Toronto group and the list 510 would include the LUNs in the 2 data storage systems of the Toronto group. If, as yet another alternative, the current scoping level selected from the menu 202 of FIG. 4 is All systems, then the current scoping level 502 would be all systems and the list 510 would include all LUNs configured in all of the 35 managed data storage systems (e.g., all the data storage systems of the groups and all the non-grouped systems managed using the management application with the GUI. If, as yet another alternative, the current scoping level selected from the menu 202 of FIG. 4 is the single data storage system 205b of the Chengdu group, then the current scoping level 502 would be a single system and the list 510 would include all LUNs configured for the single data storage system 205b of the Chengdu group.

Figure 6B:
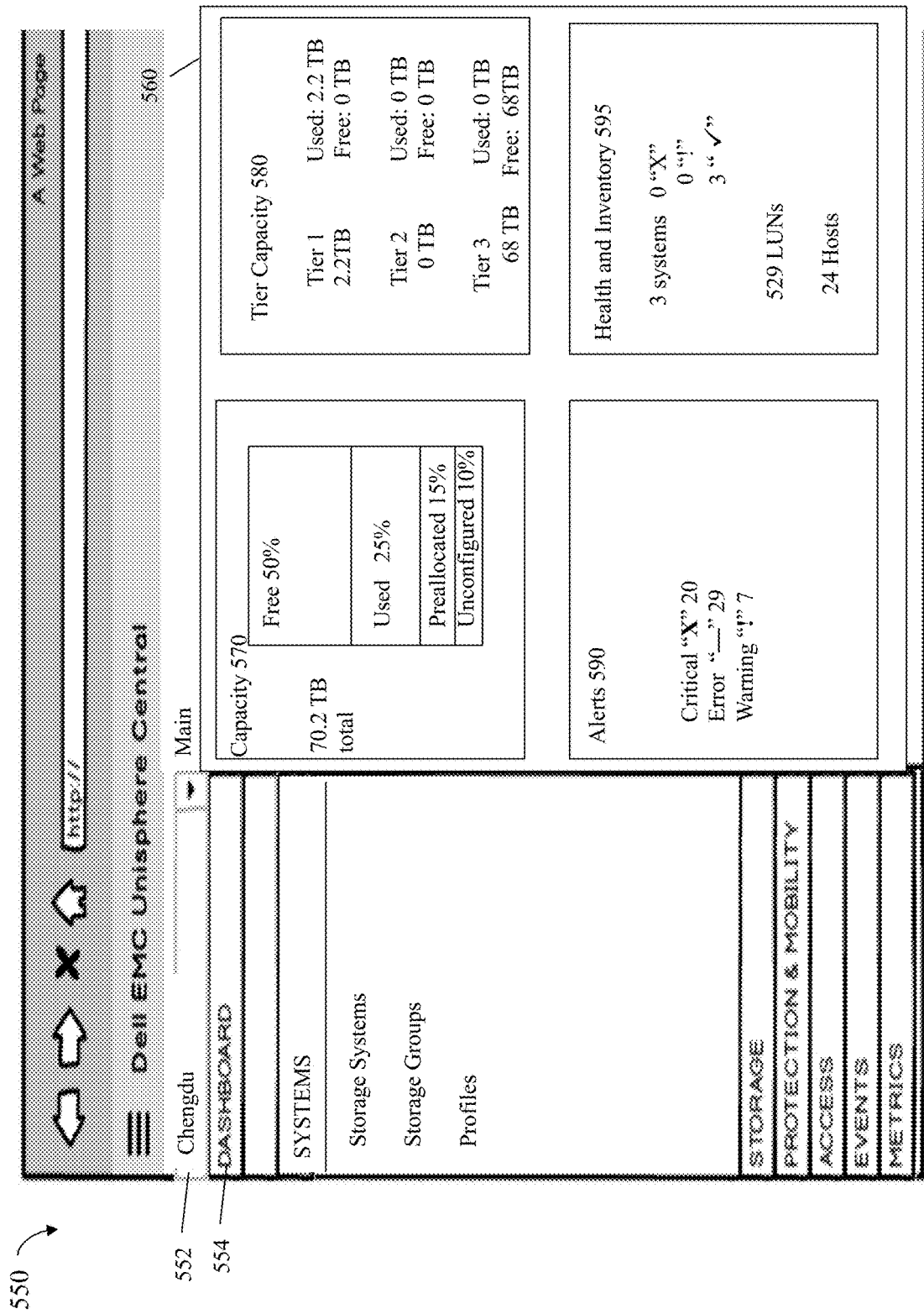

Referring to FIG. 6B, shown is a sixth screenshot that may be displayed in a GUI in an embodiment in accordance with the techniques herein. The example 550 includes the field 552 indicating that the current scoping level is set to the Chengdu group.

After switching the scoping level to the Chengdu group as just described by selecting the element 203 of the menu 202 of FIG. 4, assume the user now selects element 554 denoting the Dashboard summary to display the Dashboard based on the current scoping level. Responsive to selecting 554, the panel 560 is updated to include the dashboard summary of information based on the currently active and selected scoping level of the Chengdu group. The panel 560 lists information for the Chengdu group in a manner similar to the information listed for the all systems scoping level or view as described in connection with FIG. 3. The capacity information 570 for the Chengdu group indicates a total capacity of 70.2 TB. The tier capacity information 580 indicates 2.2 TB of tier 1 capacity, no tier 2 capacity and 68 TB of Tier 3 capacity. The alerts information 590 indicates the Chengdu group currently has 20 critical level alerts, 29 error level alerts and 7 warning level alerts. The health and inventory information 595 indicates that the 3 systems in the Chengdu group are all healthy, that the Chengdu group includes 529 LUNs and 24 hosts.

What will now be described is an example of processing that may be performed in an embodiment in accordance with the techniques herein to create a new group.

Figure 7:
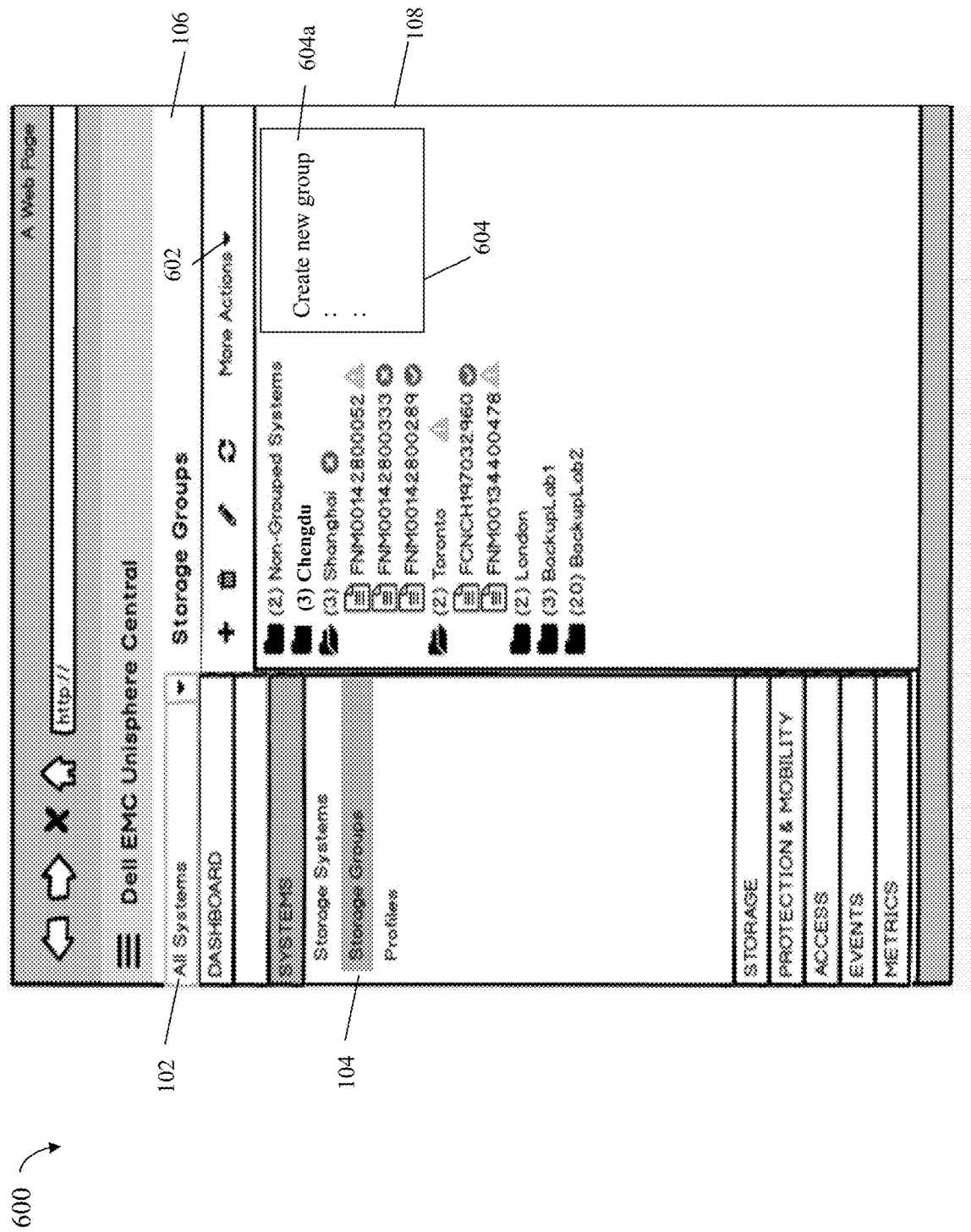

Referring to FIG. 7, shown is a seventh screenshot that may be displayed in a GUI in an embodiment in accordance with the techniques herein. The example 600 includes items as described in connection with the FIG. 2 with additional detail regarding more actions that may be taken. In the example 600, a user may select more actions, such as by right clicking on the more actions element 602. Responsive to selecting 602, drop down menu 604 may be displayed which includes menu item 604a. A user may select item 604a to create a new group. Responsive to selecting 604a, one or more screenshots may be displayed to assist the user in creating the new group.

Figure 8:
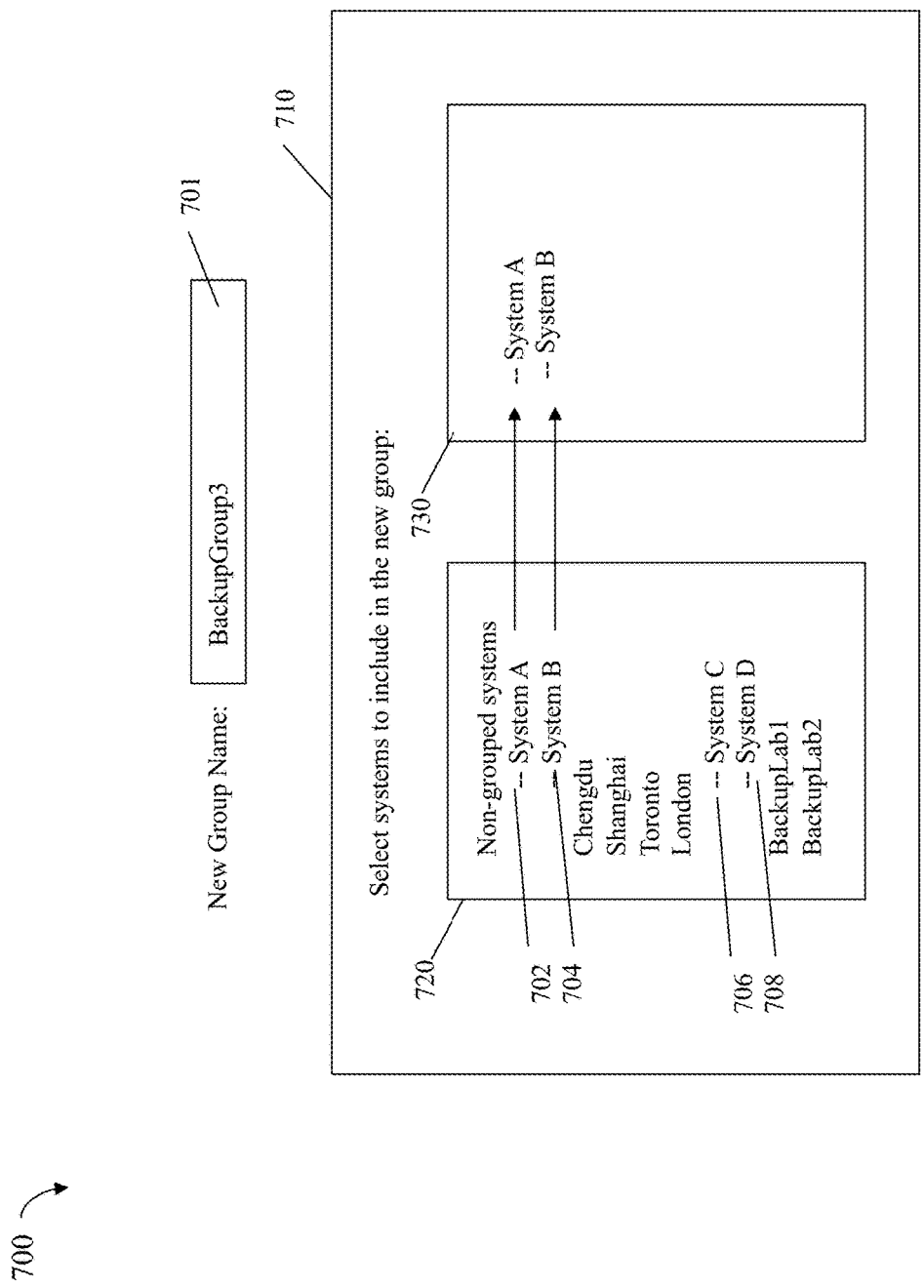

For example, response to selecting 602, the display of the GUI may be updated to present a dialogue as illustrated in the screenshot 700 of FIG. 8. In the example 700, a field 701 may be an input data field into which the user enters the name of the new group being created. The panel 710 may be used to indicate the data storage systems to includes in the new group, BackupGroup3. The area 720 may display the groups and systems in the various groups. In at least one embodiment, the area 720 may initially display the groups 108a-g such as described above in connection with the FIG. 4. A user may select one or more of the listed groups to further expand the selected one or more of the groups by listing the systems in the selected one or more groups. For example, the default existing non-grouped systems may be selected from 720 resulting in the systems 702 and 704 being displayed in the area 720. The London group may be selected from 720 resulting in the systems 706 and 708 being displayed in the area 720.

In the example 700, a user may drag and drop the particular systems from the area 720 into the area 730 where the systems in the area 730 may those selected for inclusion in the new group BackupGroup3. In this example 700, system A 702 and system B 704 may be dragged and dropped from the area 720 into the area 730 indicating that the foregoing systems 702, 704 are included in the new group BackupGroup3.

It should be noted that a particular system from one existing group may be moved to the new group Backup-Group3 by selecting the particular system from the area 720 and then dragging and dropping the selected system to the area 730. The foregoing effectively removes the particular system selected from its existing group and moves it to the new group BackupGroup3. Systems may be removed from the BackupGroup3 by selecting a system from area 730 and placing it, via drag and drop, into one of the groups in the area 720.

Figure 9:
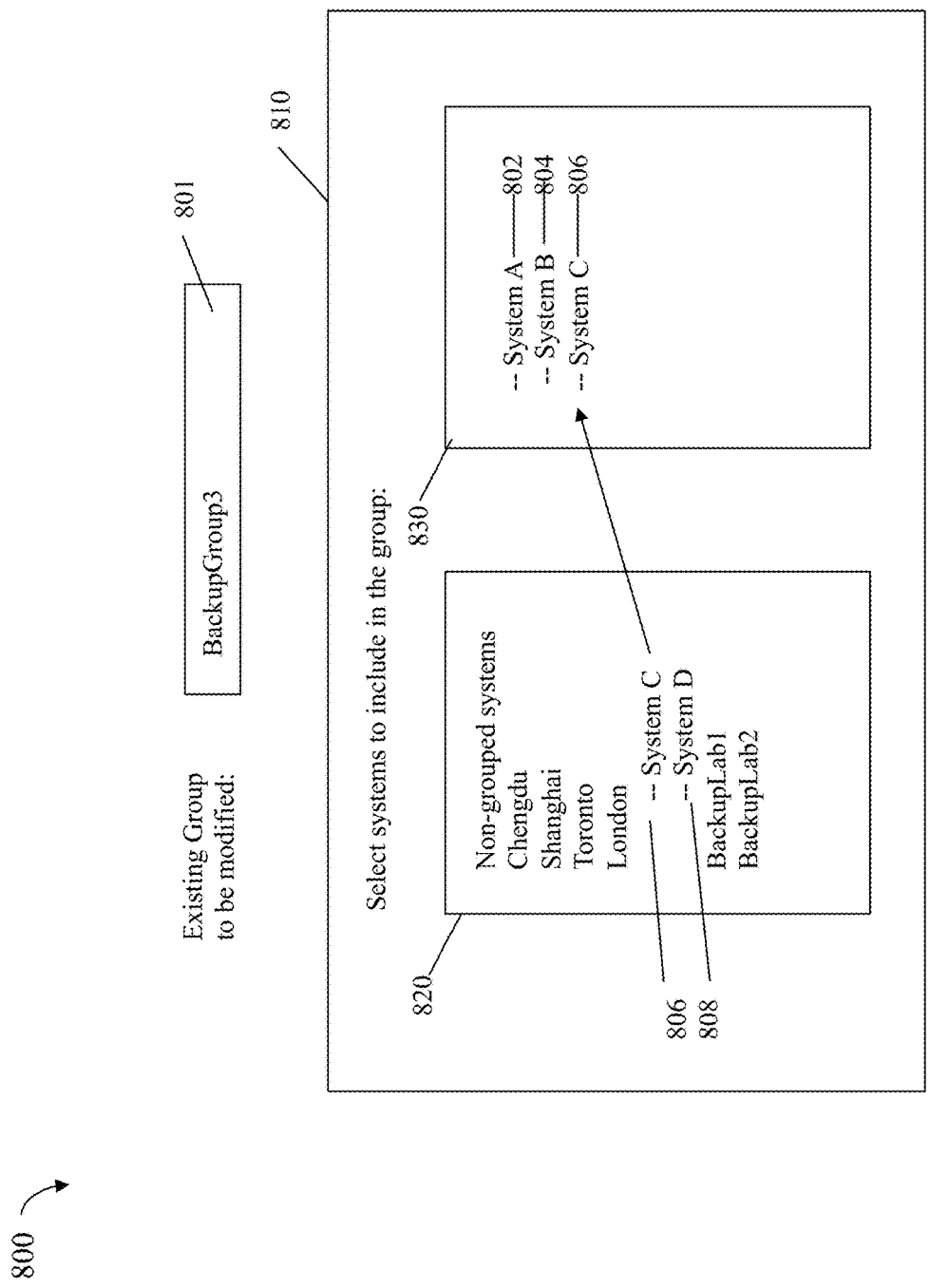

The foregoing screenshots of the FIGS. 7 and 8 are one way in which a group may be created. Other embodiments may have other screenshots and dialogues, wizards, and like, in connection with creating new groups as well as performing other group operations, such as modifying an existing group. For example, a screenshot as illustrated in FIG. 9 may be used in modifying systems included in an existing group. In this case, the field 801 may list the current existing group being modified. The panel 810 may be similar to the panel 710 of FIG. 8 as described above. The area 820 may be similar to the area 720 of FIG. 8 as described above. The area 830 may list the system currently included in the existing group being modified, BackupGroup3. In this example, the existing group BackupGroup3 includes system A 802 and system B 804. The user may select system C 706 and drag and drop system C 806 into the area 830 to move the system C 706 from the London group to the Backup-Group3. Systems may be removed from the BackupGroup3 by selecting a system from area 830 and placing it, via drag and drop, into one of the groups in the area 820.

Described above are various examples illustrating how a currently selected and active scoping level affects the displayed views of information in connection with other subsequently selected elements of the GUI. For example, FIGS. 5, 6A and 6B illustrate screenshots of the GUI including displayed information based on the currently selected active scoping level of a group that is the Chengdu group. FIG. 6B illustrates the dashboard summary of information displayed for the Chengdu group scoping level and, in contrast, FIG. 3 illustrates the dashboard summary of information displayed when the scoping level is all systems. More generally, any of the views or displays of information may be presented in the GUI in accordance with the selected active scoping level. For example, with reference back to FIG. 6A, any of the various storage entities listed in 503, such as LUNs, file systems, storage pools or pools, and the like, may be displayed to include information in accordance with the selected active scoping level for all systems, a specified group, or an individual data storage system. For example, the events 507 in the FIG. 6B may include a list of recorded alerts or logged events displayed to include information in accordance with the selected active scoping level for all systems, a specified group, or an individual data storage system. The metrics 509 in FIG. 6B may include a list of metrics such as performance related metrics (e.g., average I/O response time, I/Os per second, reads per second, writes per second) displayed to include information in accordance with the selected active scoping level for all systems, a specified group, or an individual data storage system.

What will now be described with respect to the group concept are 2 data migration or replication scenarios utilizing groups. A first scenario for data migration of LUNs from a source group to a target or destination group is described with respect to FIG. 10. A second scenario for data migration of a LUN between 2 different systems in the same group is described with reference to FIGS. 11 and 12.

Figure 10:
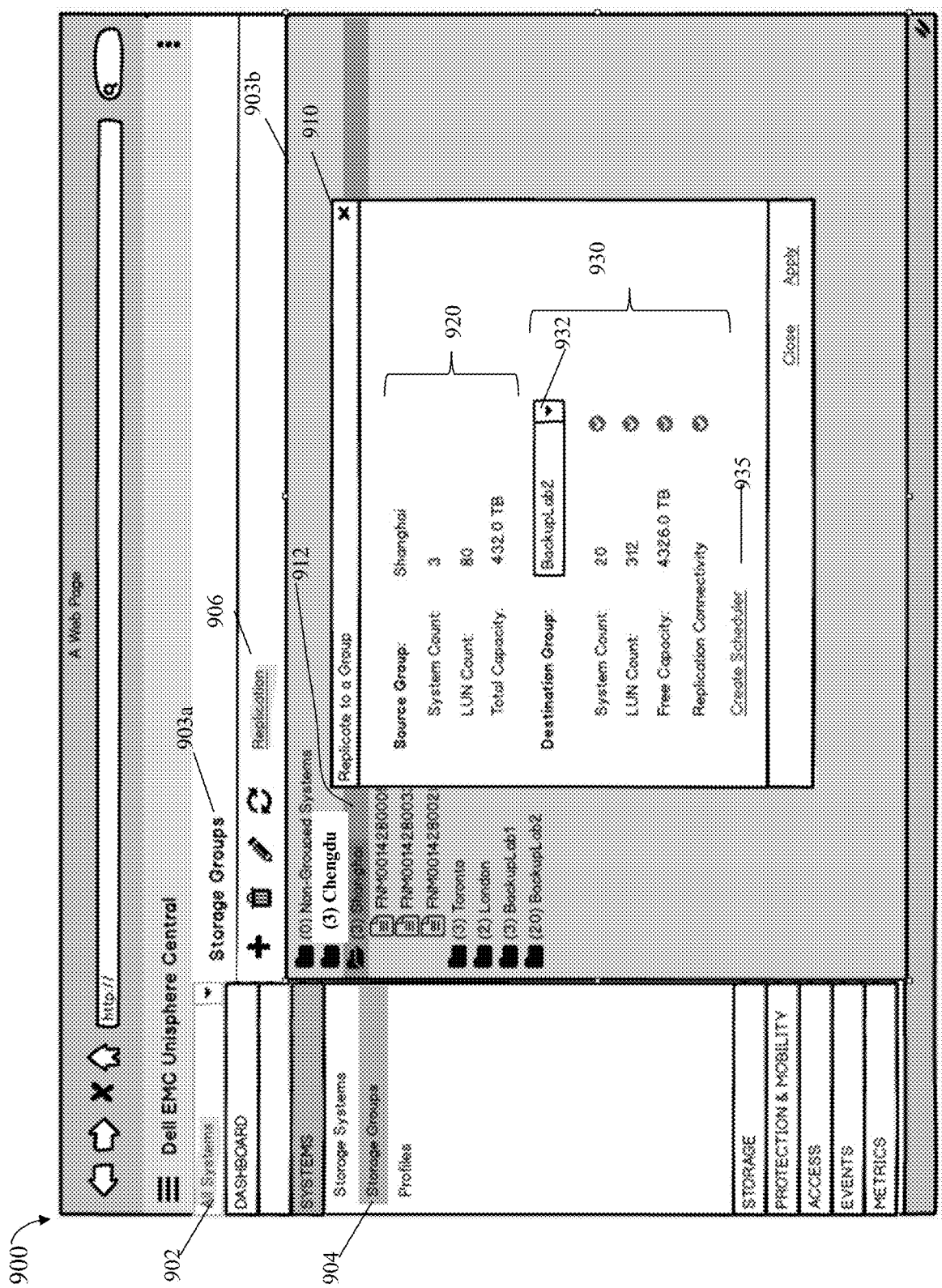

Referring to the FIG. 10, shown is an example of a screenshot of a GUI that may be used in connection with migrating data for the first scenario from a source group to a destination group in an embodiment in accordance with the techniques herein.

The example 900 includes the field 902 indicating that the scoping level is set at the all systems level. A user may select element 904 storage groups (from the systems panel) resulting in field 903a being updated to indicate the current storage groups selection. Also, responsive to selecting element 904, the area 903b of the display may be updated to list the currently defined storage groups in a manner similar to that as described above (e.g., in connection with FIG. 4). A user may select one of the listed groups, such as by selecting 912 to select the Shanghai group as the currently selected and active group. Subsequently, the user may select an operation or action of replication to be performed with respect to the currently selected Shanghai group by selecting element 906. Responsive to selecting 906, the display may be updated to include the dialog in area 910 where the currently selected and active group, the Shanghai group, may be designated as the source group of a replication operation. Element 920 lists the details of the selected Shanghai group.

Element 930 lists the details of the destination group selected for the replication operation being specified using 910. A destination group may be selected as indicated by element 932. The destination group 932 in this example is BackupLab2 that may be selected from a dropdown list (not illustrated) of existing groups. Element 930 also lists the details of the selected destination group 932, BackupLab2. Such details of 930 may include, for example, the number of systems in the destination group, the number of LUNs in the destination group, the free capacity in the destination group and an indication of whether there is replication connectivity between the source and destination groups of 910. In this example, element 930 indicates that BackupLab2 has 20 data storage systems, 312 LUNs, 4326.0 TB of free capacity and there is replication connectivity between the Shanghai group and the BackupLab2 group. Element 935 may also be selected to create or define a replication schedule.

In at least one embodiment, the 80 LUNs of the source group may be automatically replicated on any one or more systems of the destination group. Selection of the particular one or more systems of the destination group used to store the copies of the 80 source group LUNs may be performed automatically by the management application using information available regarding the various configurations of the storage on the systems of the destination group.

In at least one embodiment, the replication technology utilized in connection with replicating data from the source group to the destination group in the example 900 of FIG. 10 for backup purposes may be an asynchronous replication technology. In such an embodiment, the 80 LUNs of the source group Shanghai may be asynchronously replicated to the destination group BackupLab2. For example, the replication technology may create a complete physical copy of the 80 source group LUNs in the destination group. The copy of the source group LUNs located in the destination group may be configured in a manner similar to the source group LUNs, for example, to have the same LUN device identifiers and other characteristics. In this manner, the copy of the 80 LUNs of the source group that are located in the destination group may be used, for example, in the event of a disaster within one or more of the systems of the source group. In at least one embodiment, the replication technology may initially make a copy of the 80 LUNs from the source to the destination group. Subsequently, writes or modifications to the source group LUNs may be subsequently replicated in an ongoing manner to the corresponding LUN copies in the destination group. The replication of the writes or modifications may be performed, for example, based on a scheduled set of backup times as defined using a scheduler. In at least one embodiment, the replication of the source group LUNs to the destination group may be performed in an ongoing manner, for example, as writes are made to the source group LUNs. In at least one embodiment, the replication of the source group LUNs to the destination group may be performed on a periodic basis based on a defined schedule, such as every few hours, daily, weekly, and the like.

Figure 11:
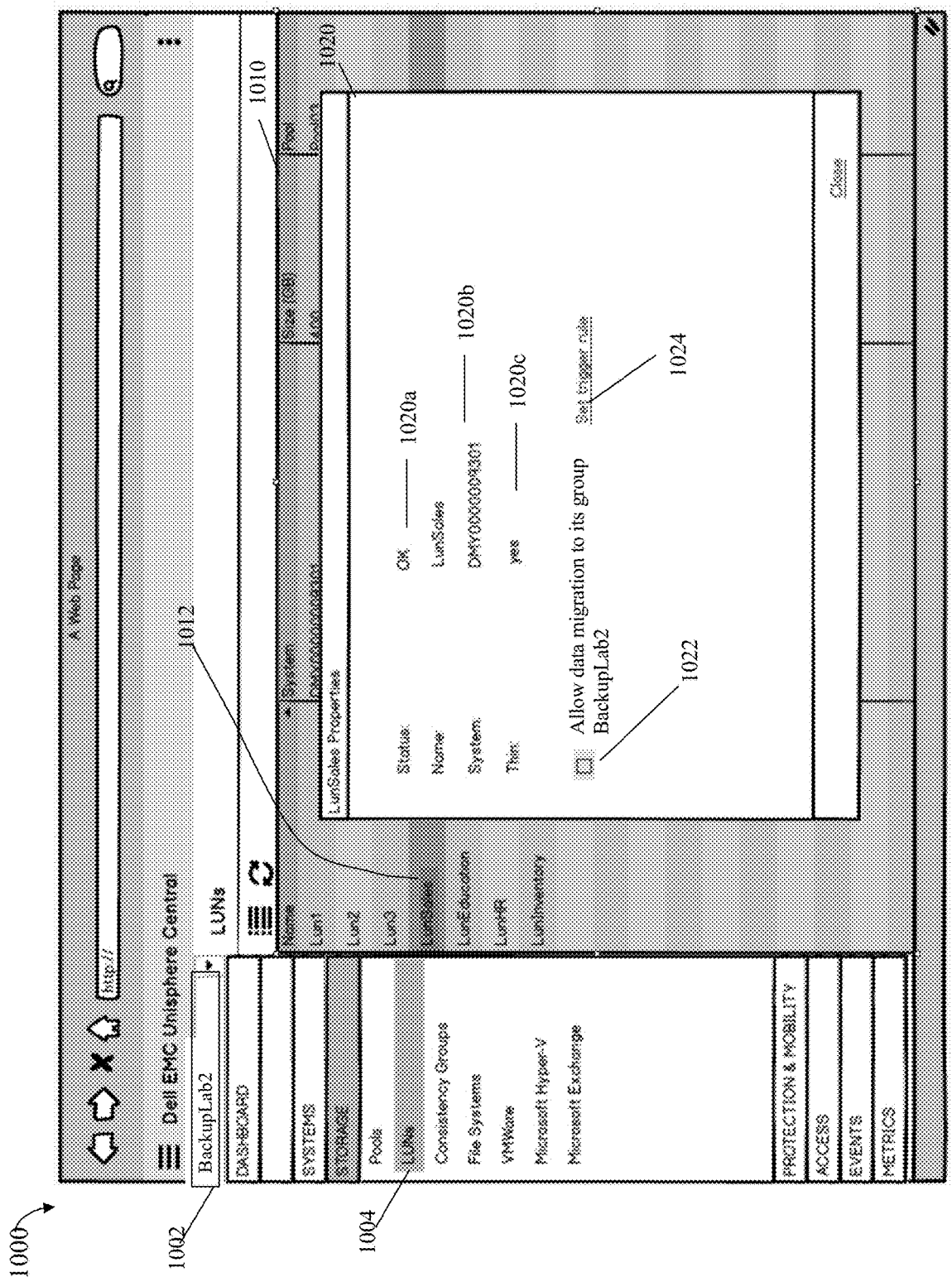

Referring to FIG. 11, shown is an example of a screenshot of a GUI that may be used in connection with migrating data for the second scenario within a group in an embodiment in accordance with the techniques herein.

In the example 1000, the current scoping level is set at the group level for the backupLab2 group as indicated in the field 1002. Additionally, a user may select element 1004 (LUNs from the storage panel) to list the LUNs for the systems of the current group scoping level. In response to selecting 1004, the display area 1010 is updated to list the LUNs in the group BackupLab2. Subsequently, one of the LUNs may be selected from the list in 1010. IN this example, the LUNSales 1012 may be selected. Responsive to selecting 1012 from the list of 1010, the panel 1020 may be displayed to list the properties of the selected LUN, LUNSales 1012. In this example, the element 1020 indicates that LUNSales has an OK status 1020a, is located on the data storage system DMY0000009301 1020b, and is configured as a thin or virtually provisioned LUN 1020c. To allow migration of the selected LUNSales to another LUN on another system in the same group BackupLab2, the user selects or checks element 1022 to allow data migration of the selected LUNSales. Additionally, the user specifies the trigger rules specifying the one or more criteria that needs to be met to trigger migration of the selected LUNSales to another system in the same group, BackupLab2.

Figure 12:
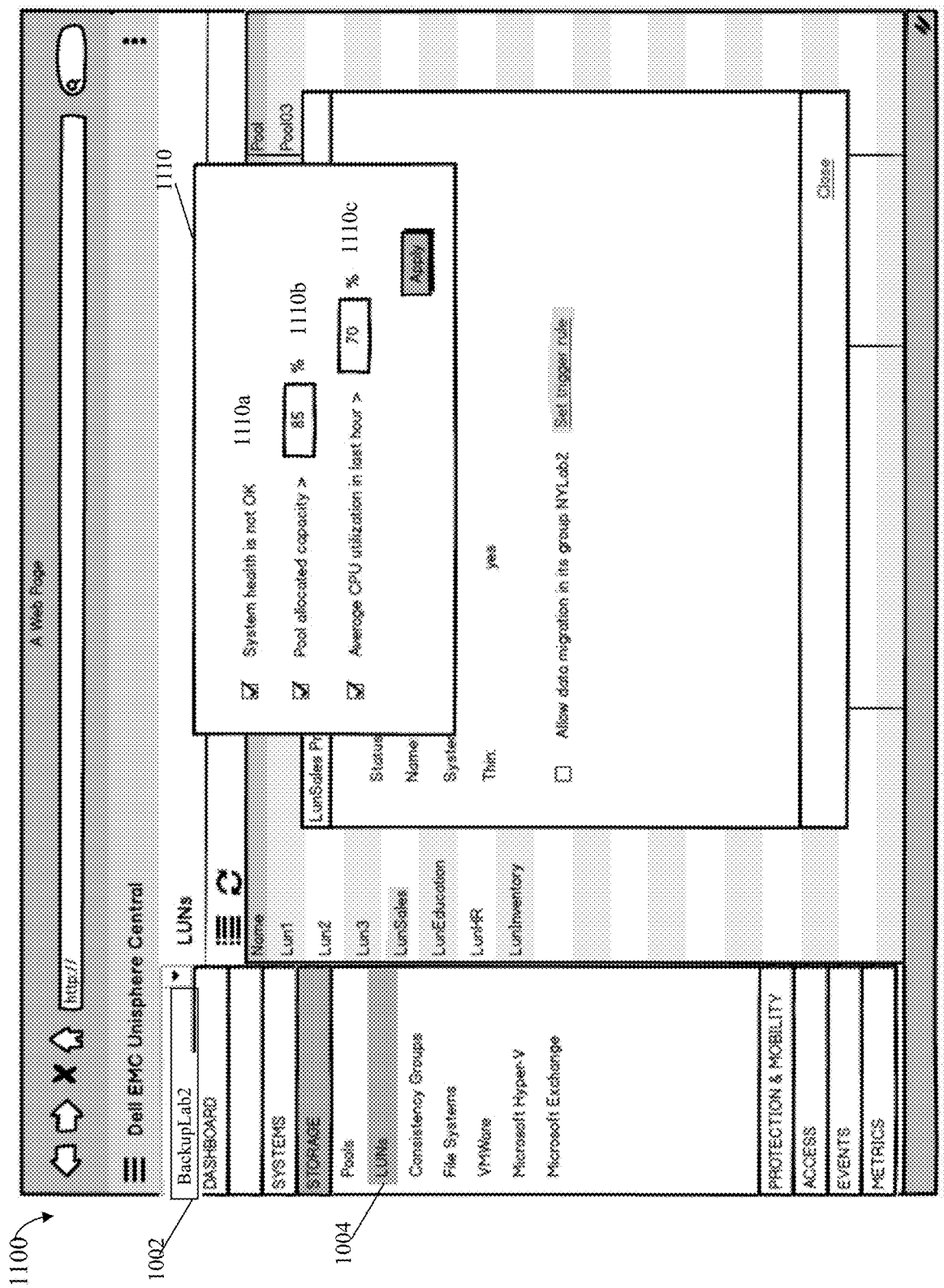

In this example, the user selects 1024 to specify the trigger rules. Responsive to selecting 1024, the GUI display may be updated to the screenshot in the example 1100 of FIG. 12. FIG. 12 includes the same items and information as in the FIG. 11 with the difference that FIG. 12 also includes the additional dialog box 1110. The box 1100 is used to specify the trigger rules including the one or more criteria triggering migration of the LUNSales to another system within the same group BackupLab2. In this example, the box 1100 list 3 criteria that may be selected. In at least one embodiment, a user may select any one or more of the listed criteria in 1110. A particular one or more of the criteria 1110a-c may be selected by selecting the checkbox next to the particular criterion.

The user may select criterion 1110a which indicates to migrate the LUN, LUNSales, from its source system to another target system within the same group, BackupLab2, if the source system is determined to be unhealthy or not OK. Generally, the state of a data storage system being unhealthy triggering the migration and meeting the criterion 1110a may vary with embodiment. For example, the state of unhealthy for a data storage system may be automatically determined by the source system based on a number of critical errors, down or failed components, and the like.

The user may select criterion 1110b which indicates to migrate the LUN, LUNSales, from its source system to another target system within the same group, BackupLab2, if the source pool from which the LUN, LUNSales is configured, has an allocated capacity greater than a specified threshold capacity, such as 85%. Since LUNSales is a thin LUN, its physical storage may be allocated on demand from a storage pool. It may be desirable to have the thin LUN be configured from a storage pool that has at least a minimum amount of free or unused storage. As a result, when the allocated capacity of the source pool of physical storage used for on-demand allocations for LUNSales exceeds 85%, the trigger condition 1110b may evaluate to true and trigger migration of LUNSales to another system having another storage pool with additional available capacity.

The user may select criterion 1110c which indicates to migrate the LUN, LUNSales, from its source system to another target system within the same group, BackupLab2, if the source system is determined to have an average CPU utilization in the last your that is greater than a specified threshold percentage, such as 70%. Generally, a high CPU utilization indicates that the source system is busy and may be overloaded by exceeding a desired maximum allowable CPU utilization. In such a source system with a utilization exceeding a threshold, such as 70%, the I/O performance with respect to LUNSales may be adversely affected by having unacceptably large I/O response times. In this case, when the criterion of 1110c evaluates to true, processing may be performed to migrate LUNSales to another system that is not as overloaded or busy as the source system in order to maintain a desired level of I/O performance.

In the example 1100, the 3 criteria 110a-c are all selected indicating that if any one of the 3 criteria evaluates to true, migration of the LUN, LUNSales, is performed where LUNSales is migrated from the source system to another target system. The migration may be performed automatically once any one of more of the selected trigger criteria is met. The selected criteria defining the trigger criteria may be included a policy denoting when to automatically migrate a LUN from a source system to a destination or target system where both the source and target systems are in the same group.

Such migration of a LUN, such as LUNSales, may be performed automatically when any of the trigger criteria evaluates to true to maintain desirable I/O performance (e.g., criterion 1110c), in order have available storage capacity that may be needed (e.g., criterion 1110b), such as with the on-demand storage allocation of a thin LUN such as LUNSales, and in order to have the data of LUNSales available for use by clients (e.g., criterion 1110a) such as the hosts within the SAN.

In at least one embodiment, the particular system of the source group used as the destination or target of the migration may be automatically selected by the management application using information available regarding the various configurations of the systems of the group.

Figure 13:
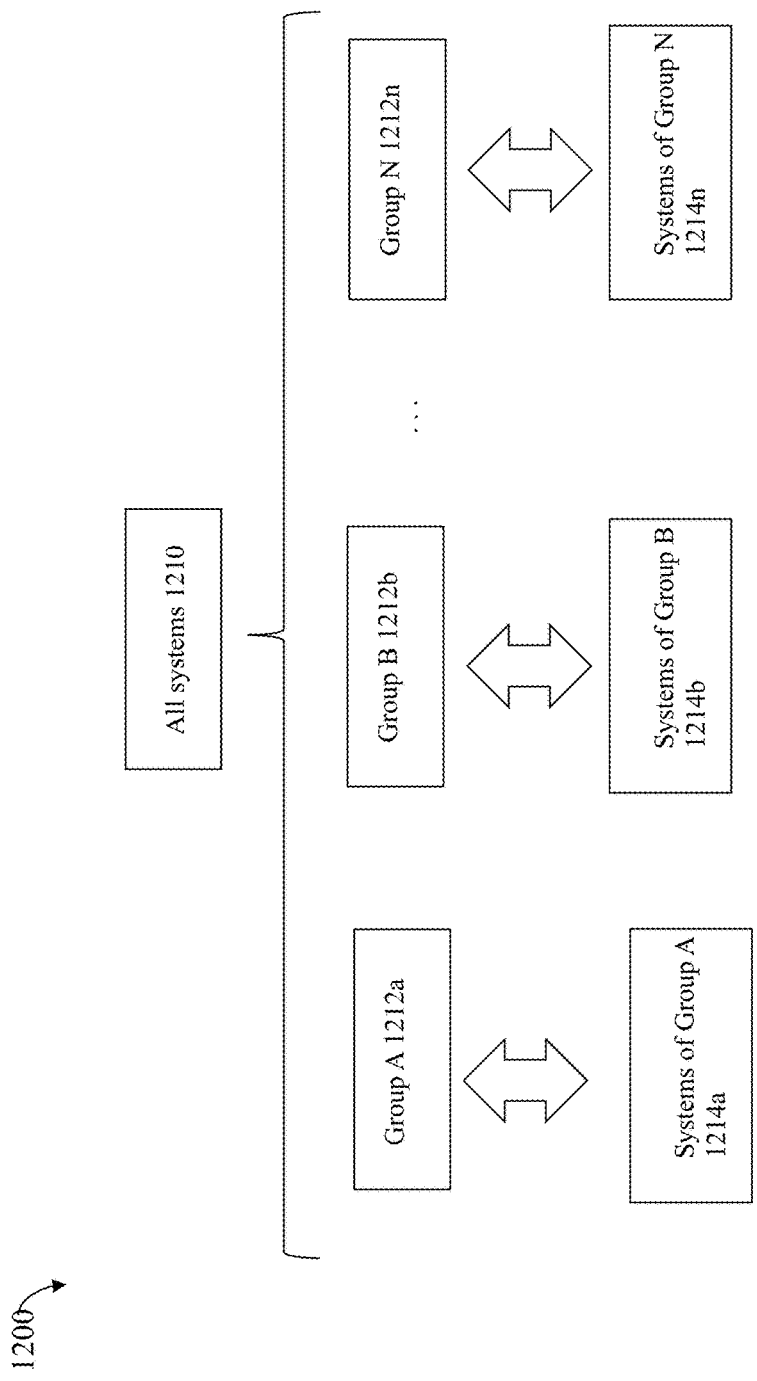
FIG. 13 is a first hierarchy of scoping levels in an embodiment in accordance with the techniques herein.

Referring to FIG. 13, shown is an example 1200 illustrating a hierarchical representation of the 3 scoping levels in an embodiment in accordance with the techniques herein. The example 1200 represents the 3 scoping levels as just described above. The all systems level 1210 includes all systems managed using the application. The all systems level 1210 may correspond to the first level in the hierarchy. The systems, such as data storage systems, may be included in groups 1212a, 1212b, . . . 1212n. The various groups 1212a-1212n may correspond to the second level in the hierarchy. Elements 1214a-1214n denote the systems, respectively, of the groups 1212a-1212n.

The embodiment described above and as generally illustrated in the FIG. 13 includes 3 scoping levels in the hierarchy with a single group level. More generally, an embodiment in accordance with the techniques herein may have more than 3 scoping level and more than a single group level. For example, with reference to FIG. 14, an embodiment may have 2 group levels where a first group level includes groups of groups (or subgroups).

Figure 14:
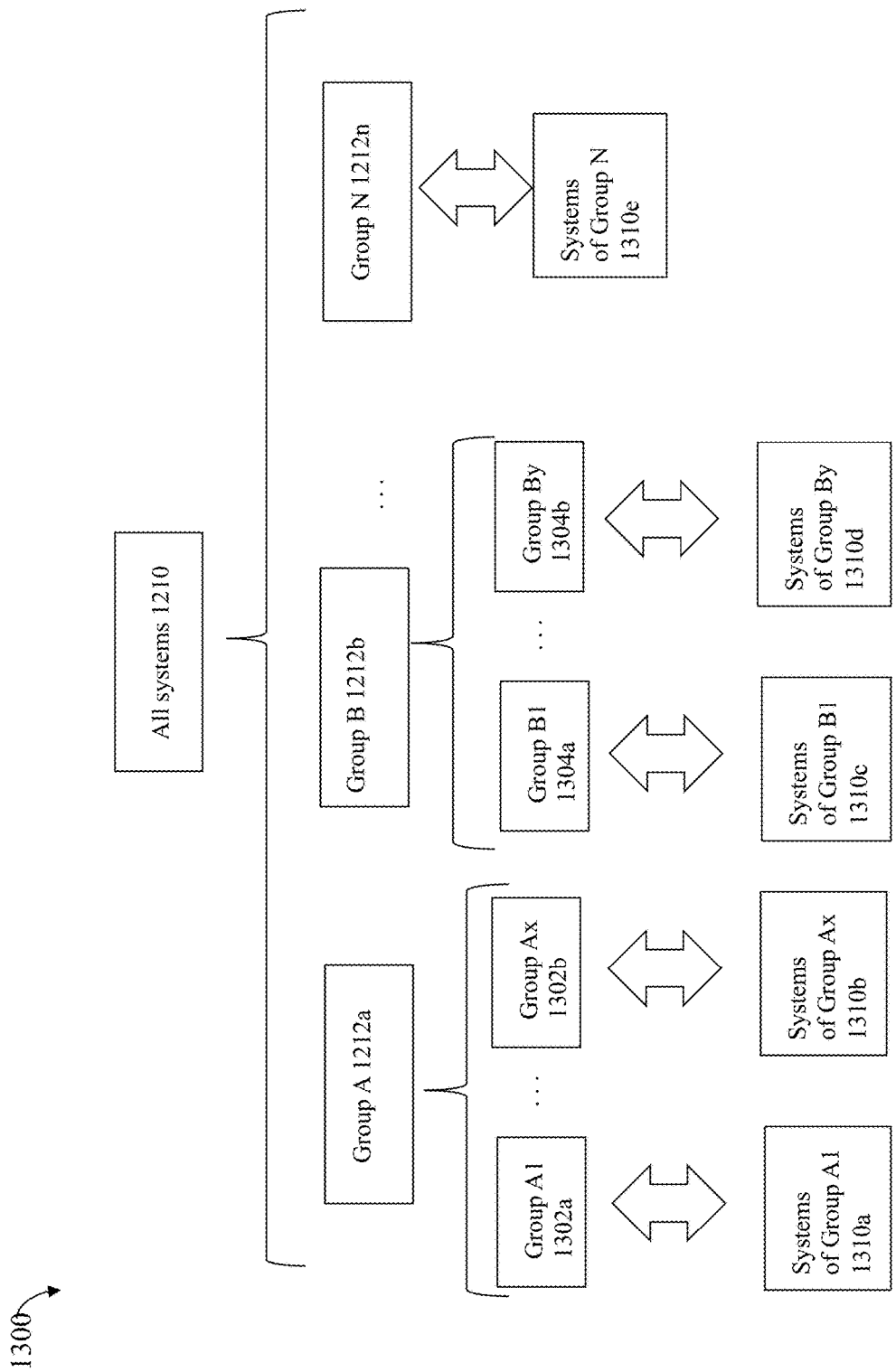
FIG. 14 is a second hierarchy of scoping levels in an embodiment in accordance with the techniques herein.

In FIG. 14, shown is an example 1300 illustrating a hierarchical representation of 4 scoping levels in an embodiment in accordance with the techniques herein. The all systems level 1210 includes all systems managed using the application. The all systems level 1210 may correspond to the first level in the hierarchy. A first layer of groups may include groups 1212a-1212n at a second level in the hierarchy. A group in the second level of the hierarchy may further include one or more other groups or subgroup. For example, group A 1212a includes groups or subgroups 1302a-1302b; and group B 1212b includes groups or subgroups 1304a-1304b. Alternatively, a group in the second level of the hierarchy may include systems. For example, group 1212n includes systems 1310e but no groups or subgroups. Although not illustrated in FIG. 14, an embodiment may also allow a group at the second level of the hierarchy to include both systems and other groups or subgroups. The third level of the hierarchy in FIG. 14 may therefore include systems, such as represented by 1310e, and may also include groups such as groups 1302a-b, and 1304a-b. Each group at the third level of the hierarchy includes systems located at the fourth level of the hierarchy. For example, group 1302a at level 3 includes systems 1310a of level 4; group 1302b at level 3 includes systems 1310b of level 4; group 1304a at level 3 includes systems 1310c of level 4; and group 1304b at level 3 includes systems 1310d of level 4.

More generally, the hierarchy as illustrated in FIGS. 13 and 14 may be more generally extended to include 3 or more levels including one or more levels of groups. In such an embodiment, the various menus and other GUI elements as well as the various operations described herein may be extended as needed to accommodate the additional levels in the hierarchy. For example, the migration scenarios described above as applied to migration or replication between groups or migration or replication within systems of the same group may also be applied to groups at any level in the hierarchy.

Figure 15:
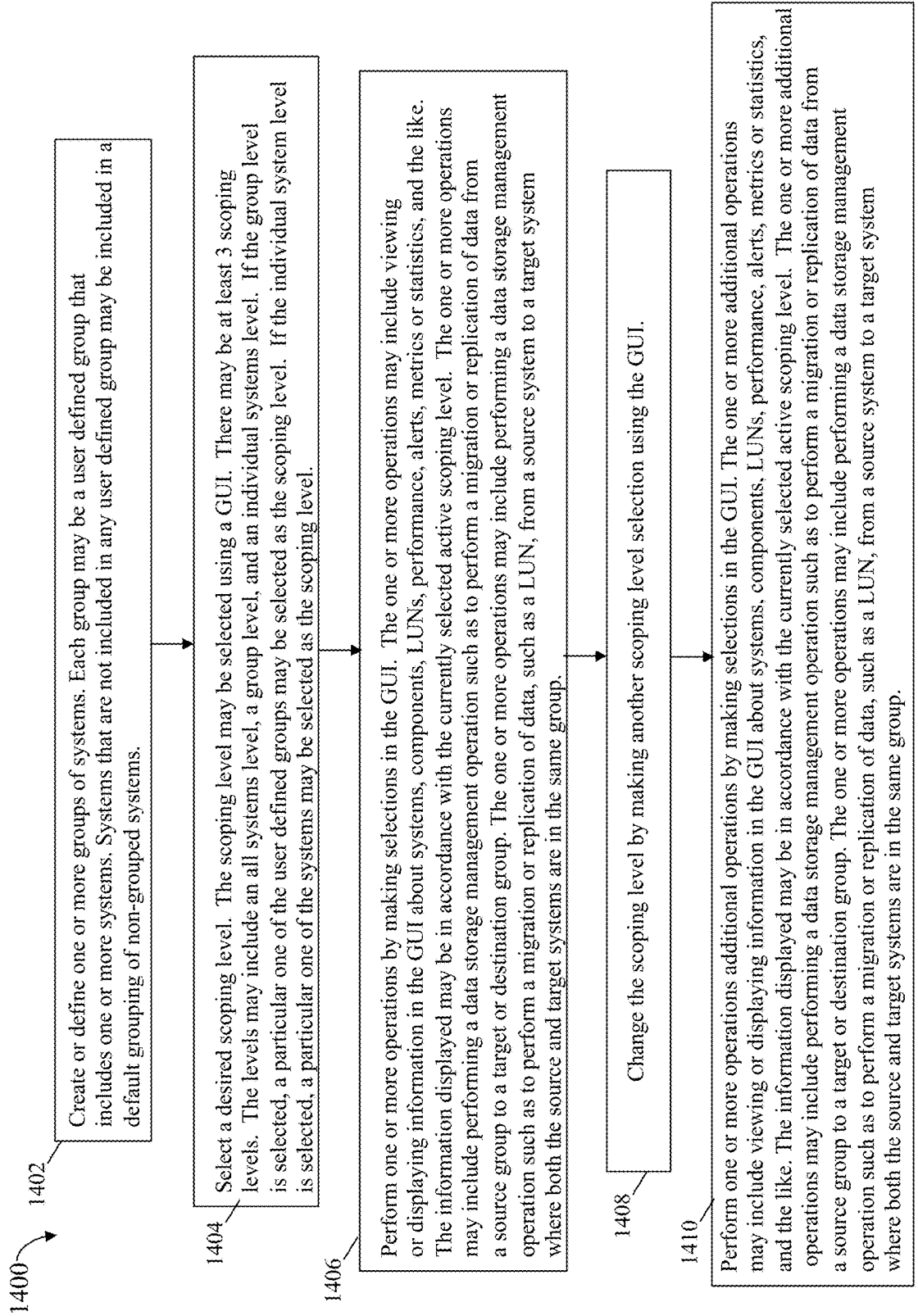
FIG. 15 is a flowchart of processing steps that may be performed in an embodiment in accordance with the techniques herein.

Referring to FIG. 15, shown is a flowchart of processing steps that may be performed in an embodiment in accordance with the techniques herein. The flowchart 1400 summarizes processing described above.

At the step 1402, processing may be performed to create or define one or more groups of systems. Each group may be a user defined group that includes one or more systems. Systems that are not included in any user defined group may be included in a default grouping of non-grouped systems. From the step 1402, control proceeds to the step 1404.

At the step 1404, processing may be performed to select a desired scoping level. The scoping level may be selected using a GUI. There may be at least 3 scoping levels. The levels may include an all systems level, a group level, and an individual systems level. If the group level is selected, a particular one of the user defined groups may be selected as the scoping level. If the individual system level is selected, a particular one of the systems may be selected as the scoping level. From the step 1404, control proceeds to the step 1406.

At the step 1406, one or more operations may be performed by making selections in the GUI. The one or more operations may include viewing or displaying information in the GUI about systems, components, LUNs, performance, alerts, metrics or statistics, and the like. The information displayed may be in accordance with the currently selected active scoping level. The one or more operations may include performing a data storage management operation such as to perform a migration or replication of data from a source group to a target or destination group. The one or more operations may include performing a data storage management operation such as to perform a migration or replication of data, such as a LUN, from a source system to a target system where both the source and target systems are in the same group. From the step 1406, control proceeds to the step 1408.

At the step 1408, the scoping level may be changed by making another scoping level selection using the GUI. The step 1410 is similar to the step 1404. From the step 1408, control proceeds to the step 1410. At the step 1410, one or more additional operations may be performed by making selections in the GUI. The one or more additional operations may include viewing or displaying information in the GUI about systems, components, LUNs, performance, alerts, metrics or statistics, and the like. The information displayed may be in accordance with the currently selected active scoping level. The one or more additional operations may include performing a data storage management operation such as to perform a migration or replication of data from a source group to a target or destination group. The one or more operations may include performing a data storage management operation such as to perform a migration or replication of data, such as a LUN, from a source system to a target system where both the source and target systems are in the same group. The step 1410 is similar to the step 1406 with the difference that the currently active scoping level has been revised or updated and the additional operations are performed with respect to the updated scoping level. Generally, processing such as described in connection with the steps 1408 and 1410 may be repeated any desired number of times.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of performing system management comprising:
defining a plurality of groups, wherein each group of the plurality of groups includes one or more systems managed using a management application, wherein the plurality of groups includes one or more user defined groups and a default group of systems not included in any of the one or more user defined groups, wherein each of the plurality of groups includes a plurality of data storage systems having a same set of attributes, wherein the plurality of groups includes a first portion of groups and a second portion of groups, wherein each group of the first portion includes data storage systems in a same geographic area, and wherein each group of the second portion includes data storage systems used for data backup;
creating a new user defined group included in the plurality of groups, wherein said creating the new user defined group comprises selecting a particular system from the default group and including the particular system in the new user defined group;
selecting a scoping level, wherein the scoping level selected is one of a plurality of scoping levels including an all systems level, a group level, and an individual system level, wherein selecting the group level includes selecting a particular one of the plurality of groups, and wherein selecting the individual system level includes selecting a particular one of the systems managed using the management application; and
performing one or more operations in accordance with the scoping level, wherein said performing one or more operations in accordance with the scoping level further includes:
responsive to determining the all systems scoping level is selected, displaying aggregated information regarding all data storage systems managed using the management application, wherein the aggregated information includes one of more of: aggregated statistics, aggregated alerts, aggregated status information, aggregated performance information, and aggregated configured logical device information regarding all data storage systems managed using the management application; and
responsive to determining a particular group of the first portion or second portion is selected, displaying information in accordance with the particular group selected, wherein the information includes any of a health indicator, performance metrics and statistics regarding the particular group.

2. The method of claim 1, wherein said selecting the scoping level is performed using a graphical user interface (GUI) of the management application and includes selecting the scoping level using a drop down menu of the GUI.

3. The method of claim 2, wherein said selecting comprises:
selecting a first group of the plurality of groups displayed in the dropdown menu of the GUI to expand the first group and further display in the drop down menu of the GUI a first set of systems included in the first group; and
selecting the individual system level including selecting a first system of the first set of system displayed in the dropdown menu of the GUI.

4. The method of claim 2, wherein said selecting includes:
selecting the group level including selecting a first group of the plurality of groups displayed in the dropdown menu of the GUI.

5. The method of claim 2, wherein said selecting includes:
selecting the all systems level from the drop down menu of the GUI.

6. The method of claim 1, wherein the one or more operations includes a first operation to display information in the GUI in accordance with the scoping level selected.

7. The method of claim 6, wherein the first operation includes displaying information regarding any of: systems, storage objects, logical devices, file systems, statistics, performance metrics, a health indicator in accordance with the scoping level selected.

8. The method of claim 1, wherein the one or more operations includes a first operation that includes migrating or replicating data from a first group of the plurality of groups to a second group of the plurality of groups, and wherein the all systems level is selected as the scoping level in said selecting.

9. The method of claim 8, wherein the first group includes a first plurality of logical devices that are replicated to the second group.

10. The method of claim 1, wherein the one or more operations includes a first operation that includes migrating or replicating data from a first system of a first group to a second system of the first group, wherein the first group is selected as the scoping level in said selecting.

11. The method of claim 10, wherein the first operation includes defining one or more criteria identifying trigger conditions of when to migrate or replicate a first logical device from the first system of the first group to the second system of the first group.

12. The method of claim 11, wherein the one or more criteria include automatically migrating or replicating the first logical device from the first system of the first group to the second system of the first group when the first system is unhealthy.

13. The method of claim 11, wherein the one or more criteria include automatically migrating or replicating the first logical device from the first system of the first group to the second system of the first group when a pool from which storage is allocated for the first logical device has an allocated capacity exceeding a threshold level.

14. The method of claim 11, wherein the one or more criteria include automatically migrating or replicating the first logical device from the first system of the first group to the second system of the first group when an average processor utilization within a defined time period for one or more processors of the first system exceeds a threshold utilization level.

15. The method of claim 1, wherein the plurality of scoping levels includes at least four levels, wherein the plurality of scoping levels includes at least two levels of groups, wherein one group in a first of the two levels of groups includes a first plurality of groups, and wherein the first plurality of groups is included in a second of the two levels of groups, and wherein each group of the first plurality of groups includes one or more of the systems managed using the management application.

16. The method of claim 1, wherein said selecting includes selecting the all systems scoping level, and wherein the one or more operations includes:
    displaying, in accordance with the all systems scoping level, the plurality of groups of data storage systems including all data storage systems managed using the management application;
    selecting, from the plurality of groups of data storage systems, a first group of data storage systems as a source group of data storage systems;
    selecting, from the plurality of groups of data storage systems, a second group of data storage systems as a destination group of data storage systems; and
    migrating or replicating data from a first plurality of logical devices of the source group of data storage systems to a second plurality of logical devices of the destination group of data storage systems, wherein the first plurality of logical devices denotes an aggregate number of logical devices configured across the first group of data storage systems, wherein said migrating or replicating includes the management application automatically selecting one or more data storage systems of the destination group that include the second plurality of logical devices.

17. A system comprising:
    one or more processors; and
    a memory comprising code stored thereon that, when executed, performs a method of performing system management comprising:
        defining a plurality of groups, wherein each group of the plurality of groups includes one or more systems managed using a management application, wherein the plurality of groups includes one or more user defined groups and a default group of systems not included in any of the one or more user defined groups, wherein each of the plurality of groups includes a plurality of data storage systems having a same set of attributes, wherein the plurality of groups includes a first portion of groups and a second portion of groups, wherein each group of the first portion includes data storage systems in a same geographic area, and wherein each group of the second portion includes data storage systems used for data backup;
        creating a new user defined group included in the plurality of groups, wherein said creating the new user defined group comprises selecting a particular system from the default group and including the particular system in the new user defined group;
        selecting a scoping level, wherein the scoping level selected is one of a plurality of scoping levels including an all systems level, a group level, and an individual system level, wherein selecting the group level includes selecting a particular one of the plurality of groups, and wherein selecting the individual system level includes selecting a particular one of the systems managed using the management application; and
        performing one or more operations in accordance with the scoping level, wherein said performing one or more operations in accordance with the scoping level further includes:
            responsive to determining the all systems scoping level is selected, displaying aggregated information regarding all data storage systems managed using the management application, wherein the aggregated information includes one of more of: aggregated statistics, aggregated alerts, aggregated status information, aggregated performance information, and aggregated configured logical device information regarding all data storage systems mana egg the management application, and
            responsive to determining a particular group of the first portion or second portion is selected, displaying information in accordance with the particular group selected, wherein the information includes any of a health indicator, performance metrics and statistics regarding the particular group.

18. A non-transitory computer readable medium comprising code stored thereon that, when executed, performs a method of performing system management comprising:
    defining a plurality of groups, wherein each group of the plurality of groups includes one or more systems managed using a management application, wherein the plurality of groups includes one or more user defined groups and a default group of systems not included in any of the one or more user defined groups, wherein each of the plurality of groups includes a plurality of data storage systems having a same set of attributes, wherein the plurality of groups includes a first portion of groups and a second portion of groups, wherein each group of the first portion includes data storage systems in a same geographic area, and wherein each group of the second portion includes data storage systems used for data backup;
creating a new user defined group included in the plurality of groups, wherein said creating the new user defined group comprises selecting a particular system from the default group and including the particular system in the new user defined group;
selecting a scoping level, wherein the scoping level selected is one of a plurality of scoping levels including an all systems level, a group level, and an individual system level, wherein selecting the group level includes selecting a particular one of the plurality of groups, and wherein selecting the individual system level includes selecting a particular one of the systems managed using the management application; and
performing one or more operations in accordance with the scoping level, wherein said performing one or more operations in accordance with the scoping level further includes:
responsive to determining the all systems scoping level is selected, displaying aggregated information regarding all data storage systems managed using the management application, wherein the aggregated information includes one of more of: aggregated statistics, aggregated alerts, aggregated status information, aggregated performance information, and aggregated configured logical device information regarding all data storage systems mana egg the management application; and
responsive to determining a particular group of the first portion or second portion is selected, displaying information in accordance with the particular group selected, wherein the information includes any of a health indicator, performance metrics and statistics regarding the particular group.

19. The non-transitory computer readable medium of claim 18, wherein said selecting the scoping level is performed using a graphical user interface (GUI) of the management application and includes selecting the scoping level using a drop down menu of the GUI.

20. The non-transitory computer readable medium of claim 19, wherein said selecting comprises:
selecting a first group of the plurality of groups displayed in the dropdown menu of the GUI to expand the first group and further display in the drop down menu of the GUI a first set of systems included in the first group; and
selecting the individual system level including selecting a first system of the first set of system displayed in the dropdown menu of the GUI.

21. The non-transitory computer readable medium of claim 19, wherein said selecting includes:
selecting the group level including selecting a first group of the plurality of groups displayed in the dropdown menu of the GUI.

\* \* \* \* \*

UNITED STATES PATENT AND TRADEMARK OFFICE
CERTIFICATE OF CORRECTION

PATENT NO. : 11,199,947 B2
APPLICATION NO. : 16/740919
DATED : December 14, 2021
INVENTOR(S) : Zhe Yang et al.

Page 1 of 1

It is certified that error appears in the above-identified patent and that said Letters Patent is hereby corrected as shown below:

In the Claims

Column 24, Line 77:
In Claim 17, the phrase "mana egg"
Should read:
-- managed using --

Column 26, Line 1:
In Claim 18, the phrase "mana egg"
Should read:
-- managed using --

Signed and Sealed this
Twelfth Day of July, 2022

Katherine Kelly Vidal
*Director of the United States Patent and Trademark Office*